United States Patent
Tai et al.

(10) Patent No.: US 12,498,318 B2
(45) Date of Patent: Dec. 16, 2025

(54) IMAGING METHOD AND BIOSENSOR FOR DETECTING SPECTRUM SHIFT

(71) Applicant: VisEra Technologies Company Ltd., Hsin-Chu (TW)

(72) Inventors: Yi-Hsin Tai, Hsin-Chu (TW); Hsin-Yi Hsieh, Hsin-Chu (TW)

(73) Assignee: VISERA TECHNOLOGIES COMPANY LTD., Hsin-Chu (TW)

( * ) Notice: Subject to any disclaimer, the term of this patent is extended or adjusted under 35 U.S.C. 154(b) by 267 days.

(21) Appl. No.: 18/515,337

(22) Filed: Nov. 21, 2023

(65) Prior Publication Data

US 2025/0164390 A1   May 22, 2025

(51) Int. Cl.
  *G01N 21/31*   (2006.01)
  *G01N 21/17*   (2006.01)
  *G01N 21/552*  (2014.01)

(52) U.S. Cl.
  CPC ......... *G01N 21/314* (2013.01); *G01N 21/554* (2013.01); *G01N 2021/1765* (2013.01); *G01N 2021/3166* (2013.01)

(58) Field of Classification Search
  CPC ............... G01N 21/314; G01N 21/554; G01N 2021/1765; G01N 2021/3166; G01N 21/553; G01N 21/41; G06V 10/143; G06V 40/00
  See application file for complete search history.

(56) References Cited

U.S. PATENT DOCUMENTS

| | | | | |
|---|---|---|---|---|
| 5,880,830 A | * | 3/1999 | Schechter | G01N 21/6456 250/461.1 |
| 7,755,767 B2 | * | 7/2010 | Ruth | G01N 21/31 356/519 |
| 7,879,619 B2 | * | 2/2011 | Jing | G01N 21/553 356/132 |
| 8,581,194 B2 | * | 11/2013 | Mikkelsen | G01J 3/32 250/339.07 |
| 9,857,225 B2 | * | 1/2018 | Pearman | G01N 21/3504 |
| 10,119,906 B2 | * | 11/2018 | Beyer | G01N 21/39 |
| 10,295,482 B1 | * | 5/2019 | Chen | G02B 3/005 |

(Continued)

FOREIGN PATENT DOCUMENTS

TW   I891233 B   *   7/2025

*Primary Examiner* — David P Porta
*Assistant Examiner* — Gisselle M Gutierrez
(74) *Attorney, Agent, or Firm* — MUNCY, GEISSLER, OLDS & LOWE, P.C.

(57) ABSTRACT

This disclosure provides an imaging method for detecting spectrum shift and a biosensor for the imaging method. The imaging method includes receiving a first light beam by a photodiode array to simultaneously obtain a first image signal with a first image intensity corresponding to a first filter and a second image signal with a second image intensity corresponding to a double-layered filter including the first filter and a second filter; receiving a second light beam by the photodiode array to simultaneously obtain a third image signal with a third image intensity corresponding to the first filter and a fourth image signal with a fourth image intensity corresponding to the double-layered filter, and determining a spectrum shift from the first light beam to the second light beam by comparing the first and the second image intensity to the third and the fourth image intensity.

20 Claims, 15 Drawing Sheets

(56) References Cited

U.S. PATENT DOCUMENTS

| | | | | |
|---|---|---|---|---|
| 11,852,534 B2* | 12/2023 | Inada | ........................ | G01J 3/12 |
| 12,181,404 B2* | 12/2024 | Zeng | .................. | G01N 33/6803 |
| 12,389,134 B2* | 8/2025 | Ishikawa | ............... | H10F 39/806 |
| 2009/0148955 A1* | 6/2009 | Cunningham | ....... | G01N 21/253 |
| | | | | 436/164 |
| 2017/0016769 A1* | 1/2017 | Chou | ........................ | G01J 3/06 |
| 2018/0245978 A1* | 8/2018 | Wang | ........................ | G01J 3/12 |
| 2022/0155237 A1* | 5/2022 | Konishi | .................... | G01J 3/18 |
| 2022/0276157 A1* | 9/2022 | Zeng | .................. | G01N 33/6803 |
| 2024/0410754 A1* | 12/2024 | Komma | .................... | G02B 5/26 |
| 2025/0164390 A1* | 5/2025 | Tai | ........................ | G01N 21/314 |
| 2025/0184625 A1* | 6/2025 | Inada | .................... | H04N 25/135 |

* cited by examiner

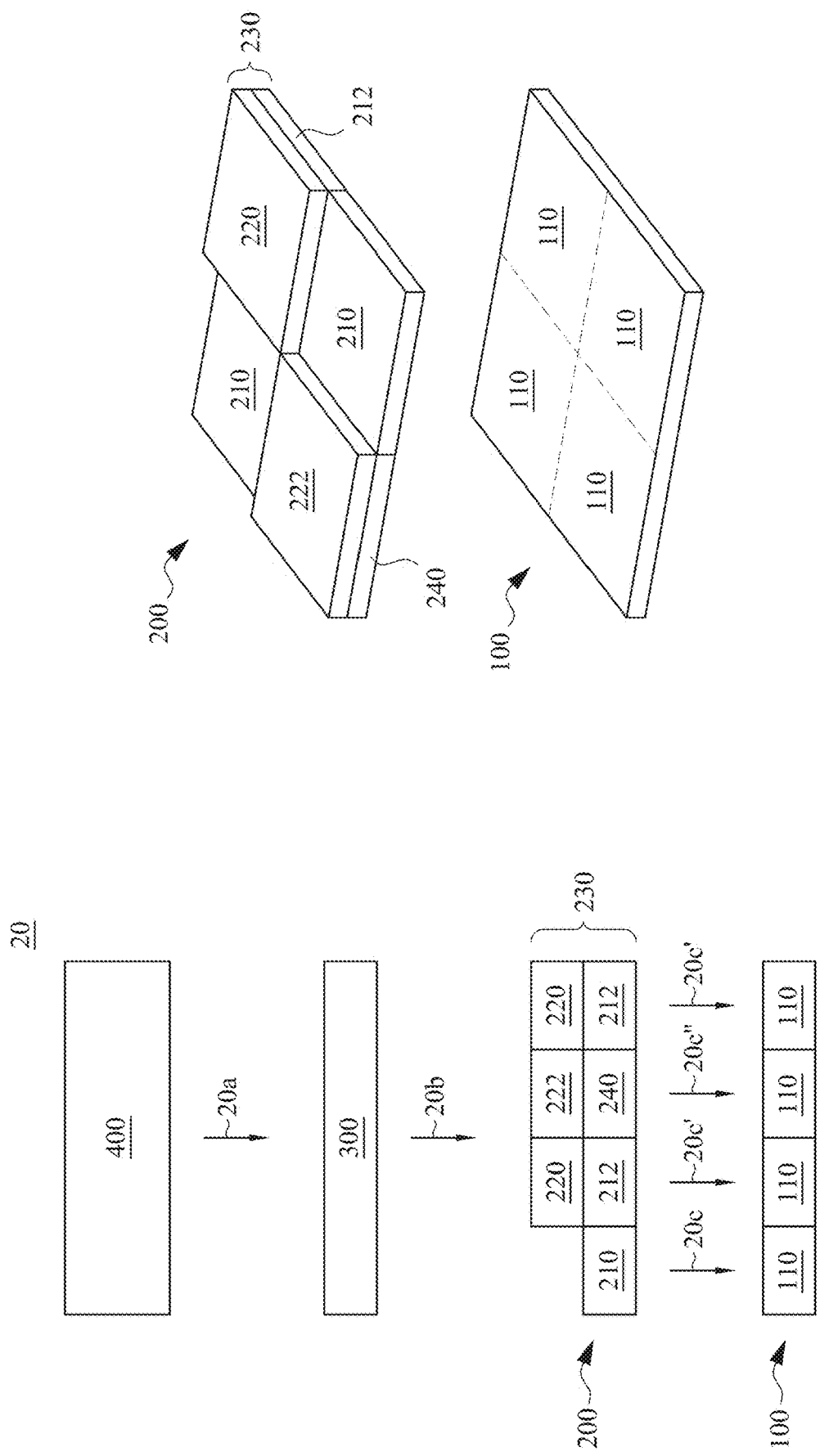

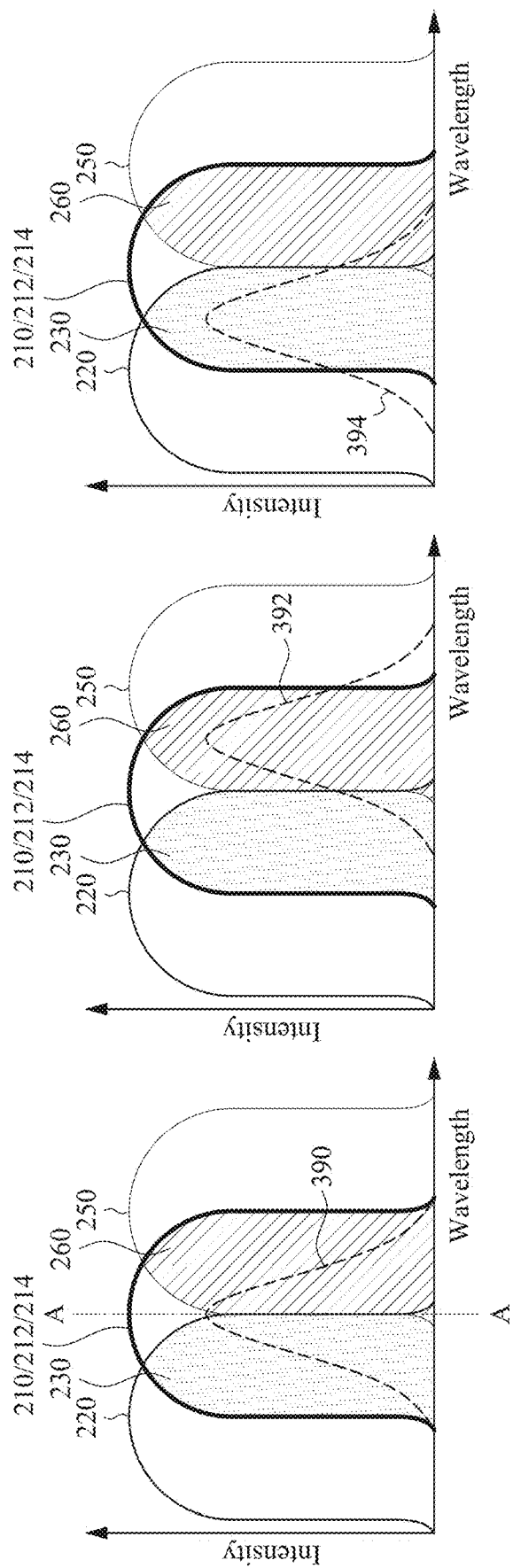

IMAGING METHOD AND BIOSENSOR FOR DETECTING SPECTRUM SHIFT

BACKGROUND

Field of Invention

The present disclosure relates to the imaging method and the biosensor for detecting spectrum shift. More particularly, the present disclosure relates to the imaging method and the biosensor using multiple filters for detecting spectrum shift.

Description of Related Art

When a target biomolecule interacts with the receptor on the substrate of the biosensor, the surface characteristic change of the substrate can be measured based on the angle or wavelength of detection light. For example, when the refractive index of the substrate has changed, the resonance spectrum of the detection light may correspondingly show a red shift or a blue shift. However, when the resonance spectrum has a high Q factor, it becomes difficult to perform the real time detection of the spectrum shift.

SUMMARY

The present disclosure provides an imaging method for detecting spectrum shift. The imaging method includes receiving a first light beam by a first photodiode and a second photodiode to simultaneously obtain a first image signal with a first image intensity from the first photodiode and a second image signal with a second image intensity from the second photodiode. The first image signal corresponds to the first light beam filtered by a first filter, and the second image signal corresponds to the first light beam filtered by a first double-layered filter including a second filter overlapped on a third filter, in which the third filter has a wavelength range same as that of the first filter. A difference between a peak wavelength of the first image signal and a center wavelength of the first filter is within ±5 nm. A difference between the peak wavelength of the first image signal and a cut-on/cut-off wavelength of the second filter is within ±5 nm. The imaging method further includes receiving a second light beam by the first photodiode and the second photodiode to simultaneously obtain a third image signal with a third image intensity from the first photodiode and a fourth image signal with a fourth image intensity from the second photodiode. The third image signal corresponds to the second light beam filtered by the first filter, and the fourth image signal corresponds to the second light beam filtered by the first double-layered filter. The imaging method further includes determining a spectrum shift from the first light beam to the second light beam by comparing the first image intensity and the second image intensity to the third image intensity and the fourth image intensity.

In some embodiments, the second image intensity is half of the first image intensity when receiving the first light beam by the first photodiode and the second photodiode.

In some embodiments, a slope of a transition band of the first filter and a slope of a transition band of the second filter are steeper than a slope of the first image signal.

In some embodiments, a wavelength range of the first image signal fully falls in the wavelength range of the first filter when receiving the first light beam by the first photodiode and the second photodiode.

In some embodiments, the first filter is a short band-pass filter, and the second filter is a long-pass filter or a long band-pass filter.

In some embodiments, determining the spectrum shift from the first light beam to the second light beam includes obtaining a signal value $\gamma 1$ and a signal value $\gamma 2$ from an Equation (I):

$$\gamma = \frac{RI_A - (I_S - RI_A)}{I_S} = \frac{2RI_A - I_S}{I_S},$$

in which R is an equilibrium parameter; $I_S$ and $I_A$ are the first image intensity and the second image intensity for the signal value $\gamma 1$; $I_S$ and $I_A$ are the third image intensity and the fourth image intensity for the signal value $\gamma 2$. The spectrum shift is determined by a difference between the signal value $\gamma 1$ and the signal value $\gamma 2$.

In some embodiments, the signal value $\gamma 1$ equals zero when receiving the first light beam by the first photodiode and the second photodiode.

In some embodiments, the first filter is a long band-pass filter, and the second filter is a short-pass filter or a short band-pass filter.

In some embodiments, determining the spectrum shift from the first light beam to the second light beam includes obtaining a signal value $\gamma 1$ and a signal value $\gamma 2$ from an Equation (II):

$$\gamma = \frac{(I_L - RI_B) - RI_B}{I_L} = \frac{I_L - 2RI_B}{I_L},$$

in which R is an equilibrium parameter; $I_L$ and $I_B$ are the first image intensity and the second image intensity for the signal value $\gamma 1$; $I_L$ and $I_B$ are the third image intensity and the fourth image intensity for the signal value $\gamma 2$. The spectrum shift is determined by a difference between the signal value $\gamma 1$ and the signal value $\gamma 2$.

In some embodiments, receiving the first light beam by the first photodiode and the second photodiode further includes receiving the first light beam by a third photodiode to simultaneously obtain a fifth image signal with a fifth image intensity from the third photodiode, the fifth image signal corresponds to the first light beam filtered by a fourth filter, in which the fourth filter has a wavelength range same as that of the second filter; and receiving the second light beam by the first photodiode and the second photodiode further includes receiving the second light beam by the third photodiode to simultaneously obtain a sixth image signal with a sixth image intensity from the third photodiode, the sixth image signal corresponds to the second light beam filtered by the fourth filter.

In some embodiments, the first filter is a short band-pass filter, and the second filter is a long band-pass filter. In such embodiments, determining the spectrum shift from the first light beam to the second light beam includes obtaining a signal value $\gamma 1$ and a signal value $\gamma 2$ from an Equation (III):

$$\gamma = \frac{RI_A + (I_L - RI_A) - (I_S + RI_A)}{I_S + I_L - RI_A} = \frac{I_L - I_S + RI_A}{I_L + I_S - RI_A}$$

or an Equation (IV):

$$\gamma = \frac{(I_L - RI_A) - RI_A - (I_S - RI_A)}{I_S + I_L - RI_A} = \frac{I_L - I_S - RI_A}{I_L + I_S - RI_A},$$

in which R is an equilibrium parameter; ($I_S$, $I_A$, $I_L$) are the first image intensity, the second image intensity, and the fifth image intensity for the signal value $\gamma 1$; ($I_S$, $I_A$, $I_L$) are the third image intensity, the fourth image intensity, and the sixth image intensity for the signal value $\gamma 2$. The spectrum shift is determined by a difference between the signal value $\gamma 1$ and the signal value $\gamma 2$.

In some embodiments, the Equation (III) is simplified to an Equation (V):

$$\gamma = \frac{RI_A - (I_S - RI_A)}{I_S + I_L - RI_A} = \frac{2RI_A - I_S}{I_L + I_S - RI_A}$$

when $I_L - RI_A = 0$. The Equation (IV) is simplified to an Equation (VI):

$$\gamma = \frac{(I_L - RI_A) - RI_A}{I_S + I_L - RI_A} = \frac{I_L - 2RI_A}{I_L + I_S - RI_A}$$

when $I_S - RI_A = 0$.

In some embodiments, the first filter is a long band-pass filter, and the second filter is a short band-pass filter. In such embodiments, determining the spectrum shift from the first light beam to the second light beam includes obtaining a signal value $\gamma 1$ and a signal value $\gamma 2$ from an Equation (VII):

$$\gamma = \frac{(I_L - RI_B) - RI_B - (I_S - RI_B)}{I_L + I_S - RI_B} = \frac{I_L - I_S - RI_B}{I_L + I_S - RI_B}$$

or an Equation (VIII):

$$\gamma = \frac{(I_L - RI_B) + RI_B - (I_S - RI_B)}{I_L + I_S - RI_B} = \frac{I_L - I_S + RI_B}{I_L + I_S - RI_B},$$

in which R is an equilibrium parameter; ($I_L$, $I_B$, $I_S$) are the first image intensity, the second image intensity, and the fifth image intensity for the signal value $\gamma 1$; ($I_L$, $I_B$, $I_S$) are the third image intensity, the fourth image intensity, and the sixth image intensity for the signal value $\gamma 2$. The spectrum shift is determined by a difference between the signal value $\gamma 1$ and the signal value $\gamma 2$.

In some embodiments, the Equation (VII) is simplified to an Equation (IX):

$$\gamma = \frac{(I_L - RI_B) - RI_B}{I_L + I_S - RI_B} = \frac{I_L - 2RI_B}{I_L + I_S - RI_B}$$

when $I_S - RI_B = 0$. The Equation (VIII) is simplified to an Equation (X):

$$\gamma = \frac{RI_B - (I_S - RI_B)}{I_L + I_S - RI_B} = \frac{2RI_B - I_S}{I_L + I_S - RI_B}$$

when $I_L - RI_B = 0$.

In some embodiments, receiving the first light beam by the first photodiode and the second photodiode further includes receiving the first light beam by a third photodiode to simultaneously obtain a fifth image signal with a fifth image intensity from the third photodiode, the fifth image signal corresponds to the first light beam filtered by a second double-layered filter including a fourth filter overlapped on a fifth filter, in which the fifth filter has a wavelength range same as that of the first filter; and receiving the second light beam by the first photodiode and the second photodiode further includes receiving the second light beam by the third photodiode to simultaneously obtain a sixth image signal with a sixth image intensity from the third photodiode, the sixth image signal corresponds to the second light beam filtered by the second double-layered filter.

In some embodiments, the first filter is a center band-pass filter, the second filter is a short-pass filter or a short band-pass filter, and the fourth filter is a long-pass filter or a long band-pass filter.

In some embodiments, determining the spectrum shift from the first light beam to the second light beam includes obtaining a signal value $\gamma 1$ and a signal value $\gamma 2$ from an Equation (XI):

$$\gamma = \frac{R(I_A - I_B)}{I_C},$$

in which R is an equilibrium parameter; ($I_C$, $I_B$, $I_A$) are the first image intensity, the second image intensity, and the fifth image intensity for the signal value $\gamma 1$; ($I_C$, $I_B$, $I_A$) are the third image intensity, the fourth image intensity, and the sixth image intensity for the signal value $\gamma 2$. The spectrum shift is determined by a difference between the signal value $\gamma 1$ and the signal value $\gamma 2$.

The present disclosure provides a biosensor for performing the imaging method for detecting spectrum shift. The biosensor includes a photodiode array including of the first photodiode and the second photodiode and a filter array including the first filter and the first double-layered filter above the photodiode array, in which the first photodiode and the second photodiode corresponds to the first filter and the first double-layered filter respectively. The biosensor further includes a sample substrate above the filter array and a light source above the sample substrate.

In some embodiments, the light source is configured to generate a surface plasmon resonance spectrum.

In some embodiments, a wavelength range of the light source covers wavelength ranges of the filter array.

In some embodiments, the short band-pass filter has a bandwidth in a range of 20 nm to 60 nm.

According to the embodiments of the present disclosure, the imaging method for detecting a spectrum shift includes receiving a light beam to simultaneously obtain several image signals and determining the spectrum shift by using the obtained image signals, in which two of the image signals are respectively filtered by a single-layered filter and a double-layered filter of a filter array of the biosensor. Since the image signals corresponding to the different filters are obtained simultaneously, the signal-noise ratio may be increased, and the real time detection of the spectrum shift may be performed. The filter array of the different filters also miniaturizes the biosensor and increases the flexibility of the spectrum shift detection range.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9A illustrates a schematic view of a biosensor for performing the imaging method in FIG. 8 according to some embodiments of the present disclosure.

FIGS. 9B-9D respectively illustrates three-dimensional partial views of the biosensor in FIG. 9A according to some embodiments of the present disclosure.

FIGS. 13A-13C and 14A-14C illustrate spectra corresponding to the imaging method in FIG. 8 and the biosensor in FIGS. 12A-12B according to some embodiments of the present disclosure.

DETAILED DESCRIPTION

Figure 1:
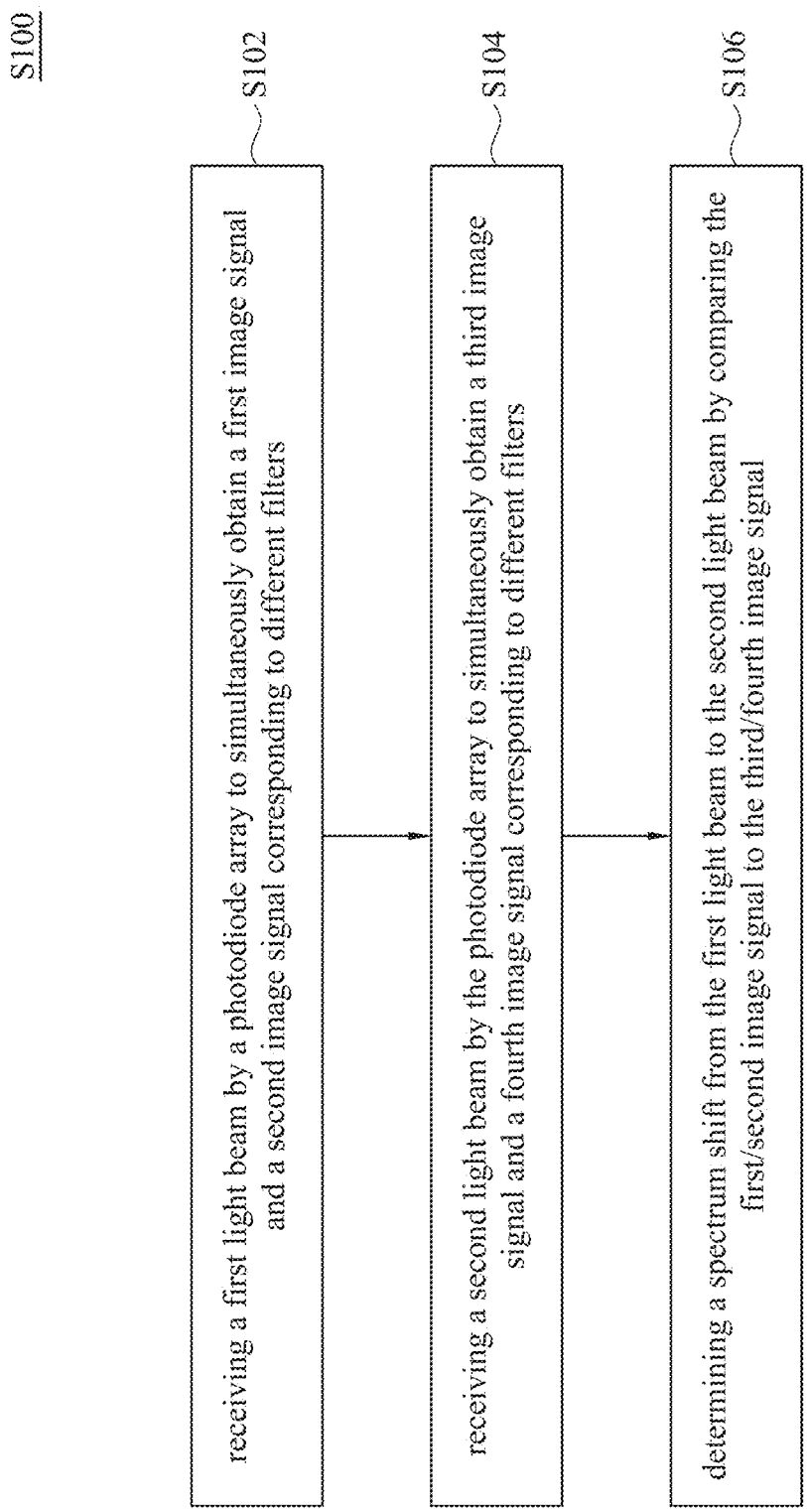
FIG. 1 illustrates a flow diagram of an imaging method for detecting spectrum shift according to some embodiments of the present disclosure.

The following disclosure provides many different embodiments, or examples, for implementing different features of the provided subject matter. Specific examples of components, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It should be understood that although the terms "first", "second", "third", etc., can be used to describe various elements, components, regions, layers and/or parts in this specification, these elements, components, regions, layers and/or parts should not be limited by these terms. These terms are used only to distinguish one element, component, region, layer, or part from another element, component, region, layer, or part. Therefore, the first element, component, region, layer, or part discussed below may be referred to as a second element, component, region, layer, or part without departing from the instructions of the specification.

The present disclosure provides an imaging method for detecting a spectrum shift and a biosensor to perform the imaging method. The imaging method includes receiving a light beam to simultaneously obtain several image signals and determining the spectrum shift by using the obtained image signals, in which two of the image signals are respectively filtered by a single-layered filter and a double-layered filter of a filter array of the biosensor. Since the image signals corresponding to the different filters are obtained simultaneously, the signal-noise ratio may be increased, and the real time detection of the spectrum shift may be performed. In addition, the filter array of the different filters miniaturizes the biosensor and increases the flexibility of the spectrum shift detection range.

Figure 2B:
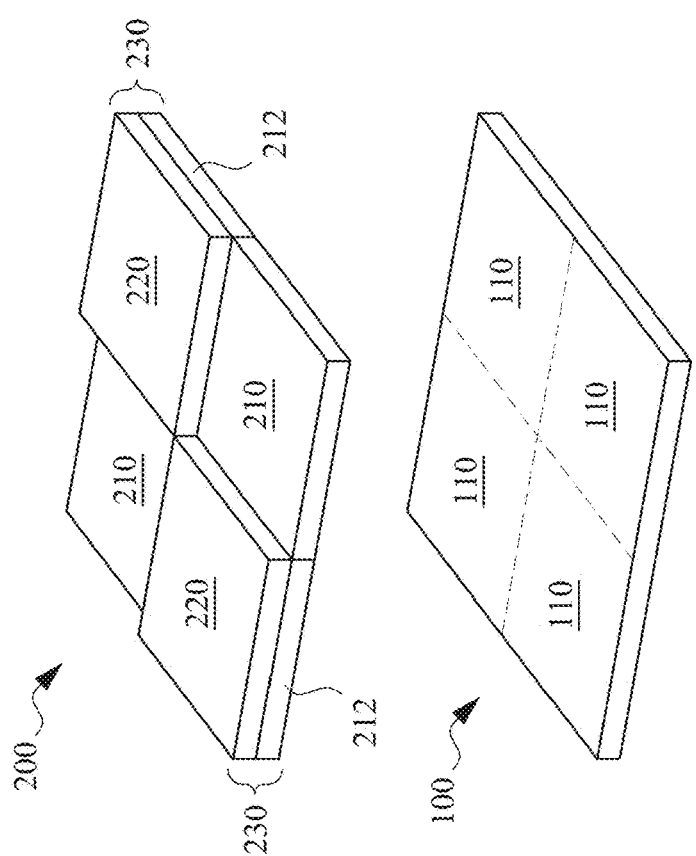
FIG. 2B illustrates a three-dimensional partial view of the biosensor in FIG. 2A according to one embodiment of the present disclosure.
Figure 2A:
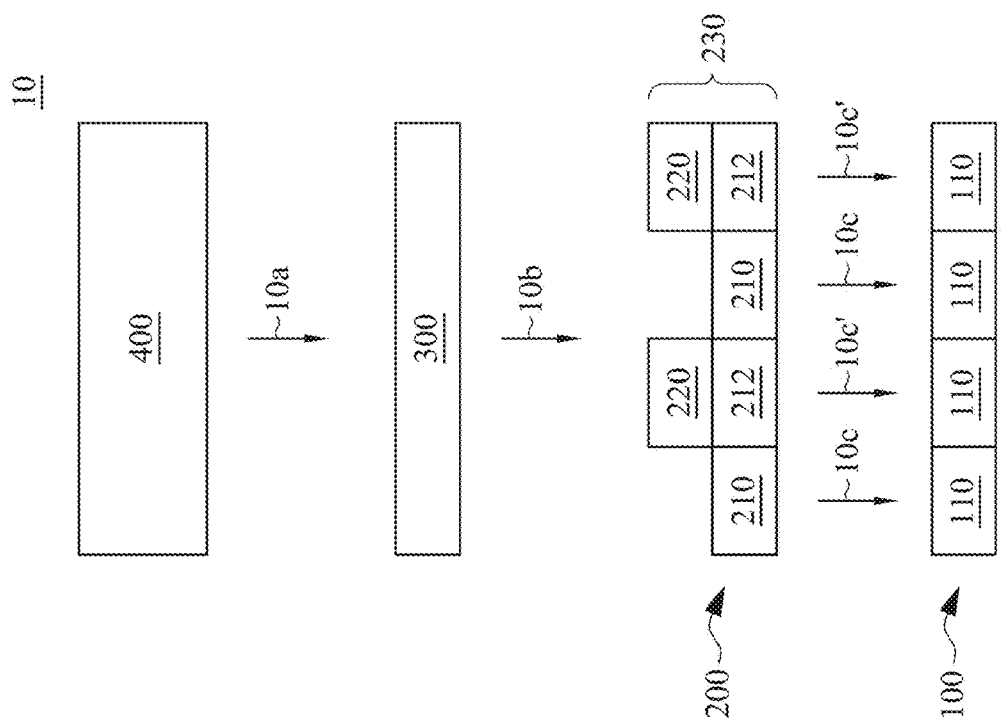
FIG. 2A illustrates a schematic view of a biosensor for performing the imaging method in FIG. 1 according to some embodiments of the present disclosure.

According to some embodiments of the present disclosure, FIG. 1 illustrates a flow diagram of an imaging method S100 for detecting spectrum shift, and FIG. 2A illustrates a schematic view of a biosensor 10 for performing the imaging method S100 in FIG. 1. Specifically, the biosensor 10 includes a photodiode array 100, a filter array 200 above the photodiode array 100, a sample substrate 300 above the filter array 200, and a light source 400 above the sample substrate 300. The light source 400 is configured to emit a light beam 10a toward the sample substrate 300. The light beam 10a transmits through or is reflected by the sample substrate 300 to generate a light beam 10b.

When a biosample is disposed or reacted into another state on the sample substrate 300, the biosample may affect the characteristic of the light beam 10b. For example, the light source 400 may be configured to generate a surface plasmon resonance (SPR) spectrum. When a biosample exists on the sample substrate 300, the SPR spectrum may show a red shift or a blue shift. In other words, different biosamples on the sample substrate 300 may provide the light beams 10b with different wavelengths.

The light beam 10b is then emitted toward the filter array 200 including a plurality of filters with different wavelength ranges. Specifically, the filter array 200 includes at least one single-layered first filter 210 with a first wavelength range, thereby filtering the light beam 10b into a light beam 10c within the first wavelength range. The filter array 200 also includes at least one double-layered filter 230 including the first filter 210 and a second filter 220 overlapped on a third filter 212. The third filter 212 has the first wavelength range same as that of the first filter 210, and the second filter 220 has a second wavelength range different from and partially overlapped with the first wavelength range. As a result, the light beam 10b is filtered into a light beam 10c' within an overlapped range of the first wavelength range and the second wavelength range by the double-layered filter 230.

In some embodiments, the first filter 210 and the double-layered filter 230 may be alternately arranged in the filter array 200, leading to the adjacent first filter 210 and double-layered filter 230 shown in FIG. 2A. As the light beam 10b reaches the filter array 200, the first filter 210 and the double-layered filter 230 simultaneously filter the light beam 10b into the light beam 10c and the light beam 10c'. In such embodiments, a wavelength range of the light source 400 may cover the wavelength ranges of the filter array 200 to simultaneously generate both the light beam 10c and the light beam 10c'. For example, the light source 400 may be a halogen lamp or a white light emitting diode (LED) with a wavelength range from 380 nm to 1300 nm.

As used herein, the terms "single-layered" and "double-layered" indicate the different layer numbers between the solely first filter 210 and the overlapped second filter 220/third filter 212, and are not intended to limit the layer numbers of the filters in practice. For example, in some embodiments, the solely first filter and the overlapped second filter/first filter may be formed on an additional common substrate of the filter array. It should be noted that, unless otherwise stated, the terms "first filter" and "second filter" alone refer to the single-layered filter. In addition, two first filters 210 and two double-layered filters 230 are illustrated in FIG. 2A as an exemplary case, and the filter array 200 including different numbers of the first filter 210 and double-layered filter 230 are within the scope of the present disclosure.

The light beam 10c and the light beam 10c' filtered by the filter array 200 are then emitted toward the photodiode array 100 including a plurality of photodiodes 110. Each of the photodiodes 110 corresponds to one of the first filter 210 or the double-layered filter 230, thereby receiving one of the light beam 10c or the light beam 10c'. Since the light beam 10c and the light beam 10c' are respectively filtered by the first filter 210 and the double-layered filter 230, the photodiode array 100 may provide intensities of spectra with two different wavelength ranges from multiple photodiodes 110.

To clearly illustrate the relationship between the photodiode array 100 and the filter array 200, FIG. 2B illustrates a three-dimensional partial view of the biosensor in FIG. 2A according to one embodiment of the present disclosure. As shown in FIG. 2B, the photodiodes 110 are arranged along two directions to form the photodiode array 100. The first filter 210 and the double-layered filter 230 are arranged along the same two directions, so that each of the photodiodes 110 is disposed below one of the first filter 210 or the double-layered filter 230. Since each of the photodiodes 110 is aligned with one of the first filter 210 or the double-layered filter 230, each of the photodiodes 110 is configured to receive the light beam only from one of the first filter 210 or the double-layered filter 230.

In the embodiments illustrated in FIG. 2A, the elements in biosensor 10 are arranged in a linear manner to miniaturize the biosensor 10. In some other embodiments, the spatially arrangement of the photodiode array 100, the filter array 200, the sample substrate 300, and the light source 400 may be non-linear, as long as the light beam 10b is able to pass through the filter array 200 and reach the photodiode array 100.

The imaging method S100 in FIG. 1 for detecting spectrum shift may be performed by using the biosensor 10 in FIGS. 2A-2B. Specifically, the operation S102 of the imaging method S100 is first performed by the biosensor 10 in an initial state, such as the biosensor 10 without the biosample or the biosensor 10 with the unreacted biosample. The light source 400 of the biosensor 10 in the initial state provides a light beam 10a to the sample substrate 300 to generate an initial light beam 10b. The initial light beam 10b is filtered into an initial light beam 10c and an initial light beam 10c' by the filter array 200. The initial light beam 10c and the initial light beam 10c' are simultaneously received by the photodiode array 100, which produces a first image signal corresponding to the initial light beam 10c and a second image signal corresponding to the initial light beam 10c'.

After the biosample is disposed or reacted in the biosensor 10, the operation S104 of the imaging method S100 is performed by the biosensor 10. Since the biosample affects the characteristic of the light beam 10b, the sample substrate 300 may emit a latter light beam 10b with a spectrum different from that of the initial light beam 10b. As a result, the spectra of the initial light beam 10c and the initial light beam 10c' are correspondingly shifted to the spectra of a latter light beam 10c and a latter light beam 10c'. As the photodiode array 100 simultaneously receives the latter light beam 10c and the latter light beam 10c', the biosensor 10 produces a third image signal corresponding to the latter light beam 10c and a fourth image signal corresponding to the latter light beam 10c'.

After obtaining the first image signal to the fourth image signal, the operation S106 of the imaging method S100 is performed to determine a spectrum shift due to the biosample. By comparing the first image signal and the second image signal to the third image signal and the fourth image signal, the spectrum shift from the initial light beam 10c and the initial light beam 10c' to the latter light beam 10c and the latter light beam 10c' is determined, which will be illustrated in further detail below.

Figure 3C:
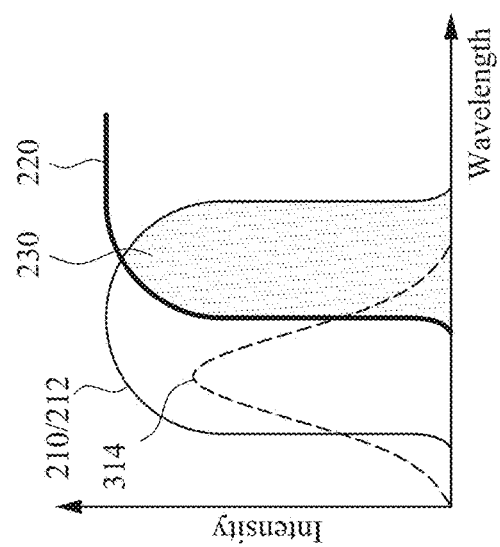
FIGS. 3A-3C, 4A-4C, 5A-5C, 6A-6C, and 7A-7C illustrate spectra corresponding to the imaging method in FIG. 1 and the biosensor in FIGS. 2A-2B according to some embodiments of the present disclosure.
Figure 3B:
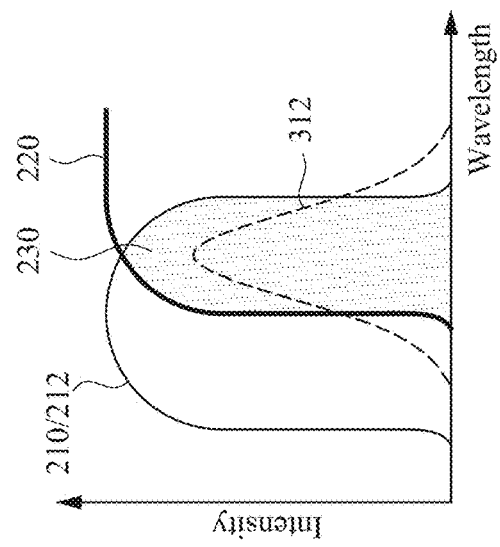
Figure 3A:
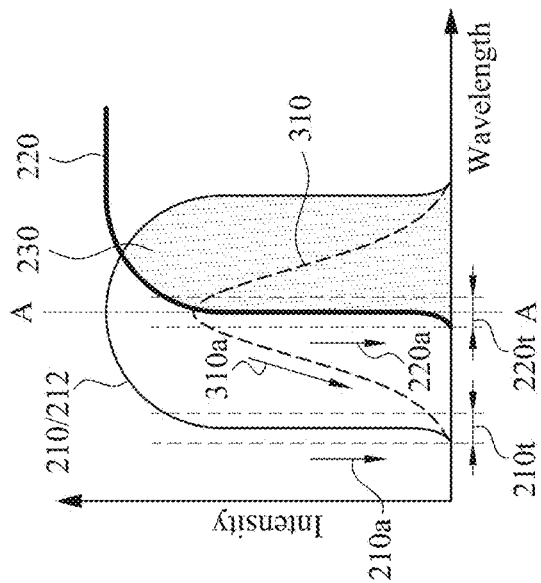

According to one embodiment of the present disclosure, FIGS. 3A-3C respectively illustrates spectra corresponding to the imaging method S100 in FIG. 1 and the biosensor 10 in FIGS. 2A-2B. As shown in FIGS. 3A-3C, the first filter 210 and the third filter 212 are the same short band-pass filter, while the second filter 220 is a long-pass filter with a wavelength range partially overlapped with that of the first filter 210. The screentone regions in FIGS. 3A-3C indicate the overlapped wavelength range, i.e., the wavelength range of the double-layered filter 230. For example, the first filter 210 may be a short band-pass filter having a bandwidth of 40 nm, and the overlapped wavelength range of the first filter 210 and the second filter 220 has a bandwidth of 20 nm. In some preferred embodiments, the bandwidth of the band-pass filter may be in a range of 20 nm to 60 nm.

FIG. 3A illustrates the spectrum 310 obtained by the biosensor in the initial state, such as in the operation S102, in which the spectrum 310 represents the unfiltered light beam from the sample substrate. As mentioned above, the spectrum 310 filtered by the first filter 210 is the first image signal, and the spectrum 310 filtered by the double-layered filter 230 is the second image signal. As shown in FIG. 3A, the wavelength range of the spectrum 310 may fully fall in the wavelength range of the first filter 210. In other words, the shortest wavelength of the spectrum 310 may be longer than or equal to the shortest wavelength passing through the first filter 210, while the longest wavelength of the spectrum 310 may be shorter than or equal to the longest wavelength passing through the first filter 210. In addition, the spectrum 310 may be evenly divided by the boundary of the screentone region representing the double-layered filter 230. As a result, the first image signal is the full spectrum 310, and the second image signal is the right half part of the spectrum 310.

Since the first image signal and the second image signal respectively corresponds to different portion of the spectrum 310, the first image signal and the second image signal show different image intensities. As used herein, the term "image intensity" indicates the area under the spectrum 310. In other words, the first image intensity of the first image signal is the area under the full spectrum 310, and the second image intensity of the second image signal is the area under the right half part of the spectrum 310.

A signal value γ1 may be obtained by using the first image intensity and the second image intensity to represent the position of the spectrum 310. Specifically, the signal value γ1 is obtained from an Equation (I):

$$\gamma = \frac{RI_A - (I_S - RI_A)}{I_S} = \frac{2RI_A - I_S}{I_S}, \quad \text{Equation (I)}$$

where R is an equilibrium parameter; $I_S$ is the first image intensity; and $I_A$ is the second image intensity. The equilibrium parameter R is used to reduce the impact of the layer number difference between the single-layered first filter 210 and the double-layered filter 230.

The second image intensity may be half of the first image intensity for the biosensor in the initial state, so that the signal value γ1 equals zero to simplify the following spectrum shift determination. Specifically, a difference between a peak wavelength of the first image signal and a center wavelength of the first filter 210 and a difference between the peak wavelength of the first image signal and a cut-on wavelength of the second filter 220 may both be within ±5 nm, leading to the center of the spectrum 310 basically aligned with the center wavelength of the first filter 210 and the cut-on wavelength of the double-layered filter 230 (referring to line A-A in FIG. 3A).

In addition to the difference between specific wavelengths, the steeper slope of the transition band (i.e., the wavelength range for a transition between a passband and a stopband) of the filter compared to the slope of the image signal may also contribute to the signal value γ1 that equals to zero. In other words, as the spectrum intensities decrease along the spectrum curves of the transition band of the filter and the image signal, the crossed wavelength range of the filter is shorter than that of the image signal. Taking FIG. 3A as an example, the slope (indicated as arrow 210a in FIG. 3A) of the transition band 210t of the first filter 210 and the slope (indicated as arrow 220a in FIG. 3A) of the transition band 220t of the second filter 220 are steeper than the slope (indicated as arrow 310a in FIG. 3A) of the first image signal (i.e., the full spectrum 310). Therefore, it becomes easier to divide the spectrum 310 evenly by the boundary of the spectrum of the double-layered filter 230 to give a signal value γ1 being equal to zero.

FIG. 3B illustrates the spectrum 312 obtained by the biosensor in a latter state, such as in the operation S104, in which the spectrum 312 represents the unfiltered light beam from the sample substrate. As mentioned above, the spectrum 312 filtered by the first filter 210 is the third image signal with the third image intensity, and the spectrum 312 filtered by the double-layered filter 230 is the fourth image signal with the fourth image intensity. A signal value γ2 may be obtained from the Equation (I) to represent the position of the spectrum 312, where R is the equilibrium parameter; $I_S$ is the third image intensity; and $I_A$ is the fourth image intensity. As shown in FIG. 3B, twice of the fourth image intensity is larger than the third image intensity, leading to the signal value γ2 larger than zero.

Since the signal value γ1 and the signal value γ2 respectively represents the position of the spectrum 310 and the spectrum 312, the spectrum shift from the spectrum 310 to the spectrum 312 may be determined by the difference between the signal value γ1 and the signal value γ2. In other words, the spectrum shift from the light beam of the biosensor in the initial state to the light beam of the biosensor in the latter state may be determined by comparing the first image intensity and the second image intensity to the third image intensity and the fourth image intensity. Referring to FIG. 3A and FIG. 3B, when the spectrum 310 with smaller wavelength is shifted to the spectrum 312 with larger wavelength, the signal value γ1 correspondingly changes to the signal value γ2. This indicates that a signal value γ changes from zero to a positive number when a red shift occurs from the spectrum 310 to the spectrum 312.

Similarly, a blue shift of the spectrum may also be determined by the change of the signal value γ. FIG. 3C illustrates the spectrum 314 obtained by the biosensor in a latter state, in which the spectrum 314 represents the unfiltered light beam from the sample substrate. When FIG. 3A and FIG. 3C respectively corresponds to the operation S102 and operation S104, the spectrum 314 filtered by the first filter 210 is the third image signal with the third image intensity, and the spectrum 312 filtered by the double-layered filter 230 is the fourth image signal with the fourth image intensity. A signal value γ2 may be obtained from the Equation (I) to represent the position of the spectrum 314, leading to the signal value γ2 smaller than zero. Accordingly, a signal value γ changes from zero to a negative number when a blue shift occurs from the spectrum 310 to the spectrum 314.

In addition to determining the red shift and the blue shift of the spectrum, the signal value γ1 and the signal value γ2 may be used to determine a spectrum without shifts when the signal value γ2 keeps the same as the signal value γ1. For example, as FIG. 3A corresponds to the biosensor in the initial state, the signal value γ1 equals zero. If the biosample in the biosensor remains unreacted, the spectra of the light beam from the sample substrate may remain unchanged. As a result, the signal value γ remains zero for the spectrum without red shift and blue shift.

The imaging method S100 of FIG. 1 performed by the biosensor 10 of FIGS. 2A-2B may provide advantageous. The filter array 200 includes the first filter 210 and the double-layered filter 230 with different wavelength ranges, so that the photodiode array 100 receives the light beam 10c and light beam 10c' simultaneously. As a result, the two image signals, such as the first image signal and the second image signal in the operation S102, corresponding to the two filters are obtained simultaneously to give the signal value γ of the spectrum. The one-time measurement of the two image signals reduces the noise impact on the signal value γ, which improves the accuracy of determining the spectrum shift. The one-time measurement of the two image signals also allows the immediate output of the signal value γ to realize the real time detection of the spectrum shift even if the spectrum has a high Q factor.

Figure 4C:
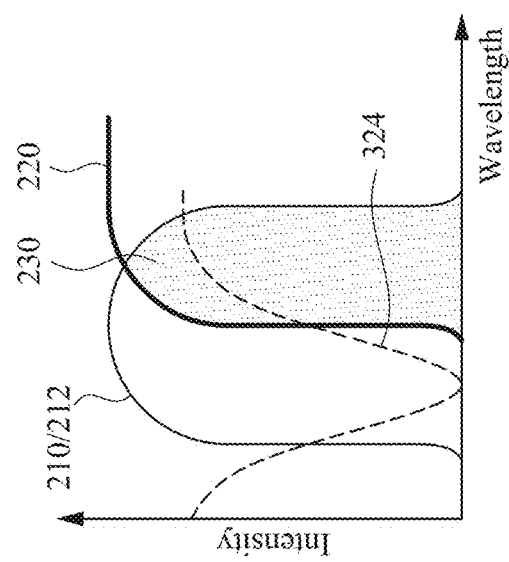
Figure 4B:
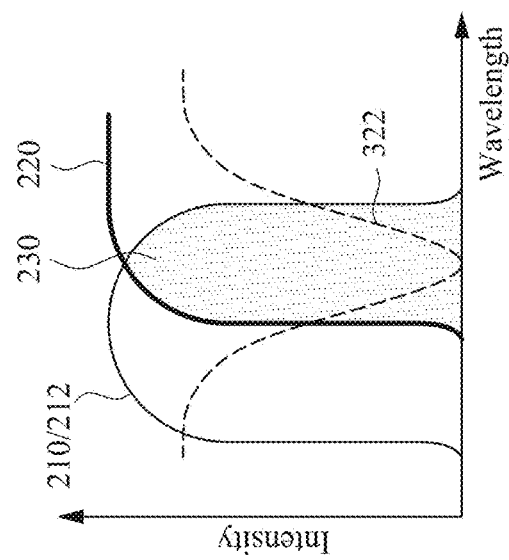
Figure 4A:
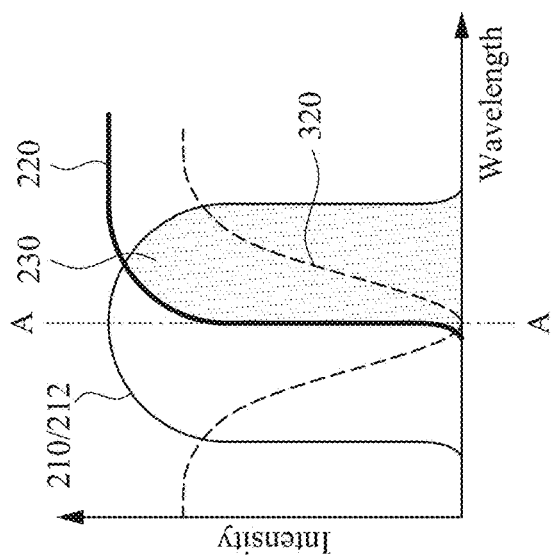

The spectra 310 to 314 have peak values in the embodiment illustrated in FIGS. 3A-3C. According to another embodiment of the present disclosure, FIGS. 4A-4C respectively illustrates spectra 320 to 324 corresponding to the imaging method S100 in FIG. 1 and the biosensor in FIGS. 2A-2B. The operations and the biosensor of FIGS. 4A-4C are similar to those of FIGS. 3A-3C, but the biosample of FIGS. 4A-4C leads to the spectra 320 to 324 with valley values. The spectrum shift of the spectra 320 to 324 may also be determined by the imaging method S100, although the results of the signal values are different from those of the spectra 310 to 314.

Referring to FIG. 4A, a difference between the peak wavelength of the spectrum 320 and the center wavelength of the first filter 210 and a difference between the peak wavelength of the spectrum 320 and the cut-on wavelength of the second filter 220 may be within ±5 nm for the biosensor in the initial state. As the image intensity filtered by the double-layered filter 230 is half of the image intensity filtered by the first filter 210, the signal value γ being equal to zero is obtained from the Equation (I). When the spectrum 320 is shifted to the spectrum 322 shown in FIG. 4B, twice of the image intensity filtered by the double-layered filter 230 is smaller than the image intensity filtered by the first filter 210. On the other hand, twice of the image intensity filtered by the double-layered filter 230 is larger than the image intensity filtered by the first filter 210 when the spectrum 320 is shifted to the spectrum 324 shown in FIG. 4C. Accordingly, a signal value γ changes from zero to a negative number for the red shift of the spectrum, and a signal value γ changes from zero to a positive number for the blue shift of the spectrum. The results of the embodiments in FIGS. 3A-4C for detecting the spectrum shift are listed in Table 1 below.

TABLE 1

|  | Spectrum with peak value | Spectrum with valley value |
|---|---|---|
| Initial or No shifting | γ = 0 | γ = 0 |
| Red shift | γ > 0 | γ < 0 |
| Blue shift | γ < 0 | γ > 0 |

As mentioned above, the first filter 210 and the second filter 220 are respectively a short band-pass filter and a long-pass filter in the embodiment illustrated in FIGS. 3A-3C. In some other embodiments, the first filter 210 and the second filter 220 may be a combination of other filters according to the spectrum of the light beam from the sample substrate. For example, FIGS. 5A-7C respectively illustrates spectra corresponding to the imaging method S100 in FIG. 1 and the biosensor 10 in FIGS. 2A-2B according to some embodiments of the present disclosure. The operations and the biosensor of FIGS. 5A-7C are similar to those of FIGS. 3A-3C, but the filters of FIGS. 5A-7C are changed to match with the spectra 330 to 354.

Figure 5C:
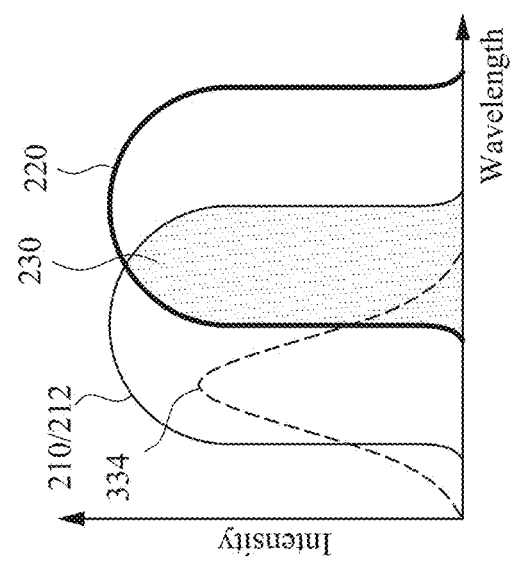
Figure 5B:
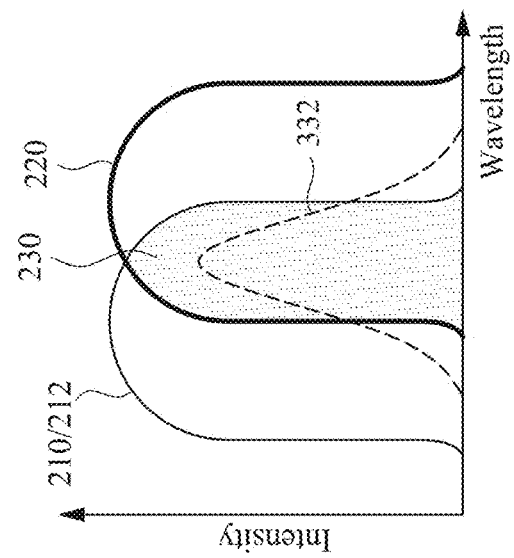
Figure 5A:
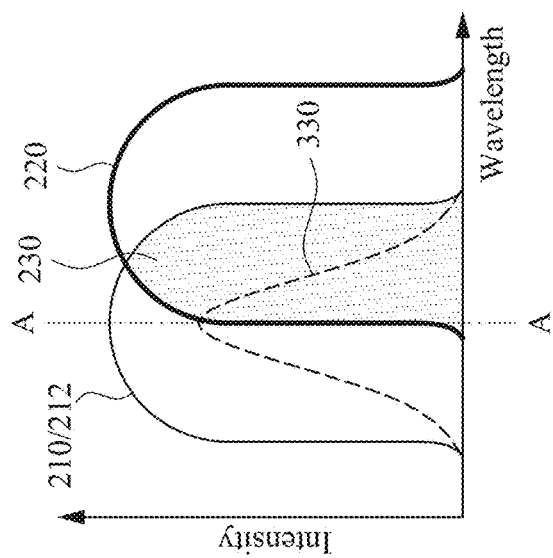

Referring to FIGS. 5A-5C, the first filter 210 and the third filter 212 are the same short band-pass filter, and the second filter 220 is a long band-pass filter with a wavelength range partially overlapped with that of the first filter 210. Since the wavelength range of the first filter 210, the wavelength range of the double-layered filter 230, and the position of the spectrum 330 are similar to those of FIGS. 3A-3C, the signal values γ of the spectra 330 to 334 may be obtained from the Equation (I), where R is an equilibrium parameter; $I_S$ is the image intensity filtered by the first filter 210; and $I_A$ is the image intensity filtered by the double-layered filter 230.

Figure 6C:
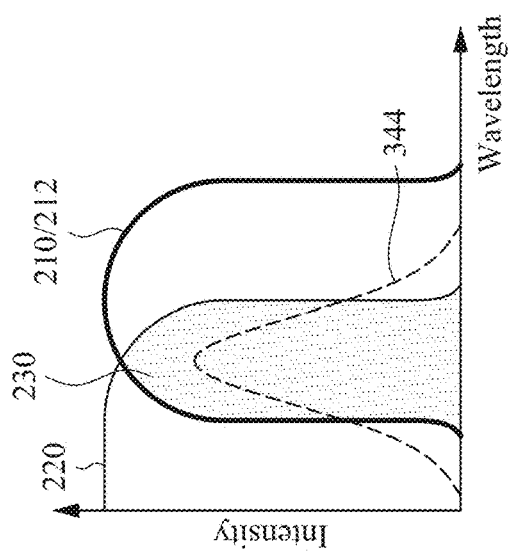
Figure 6B:
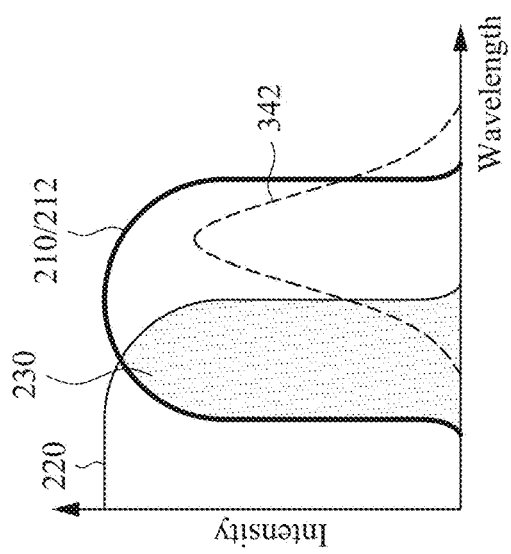
Figure 6A:
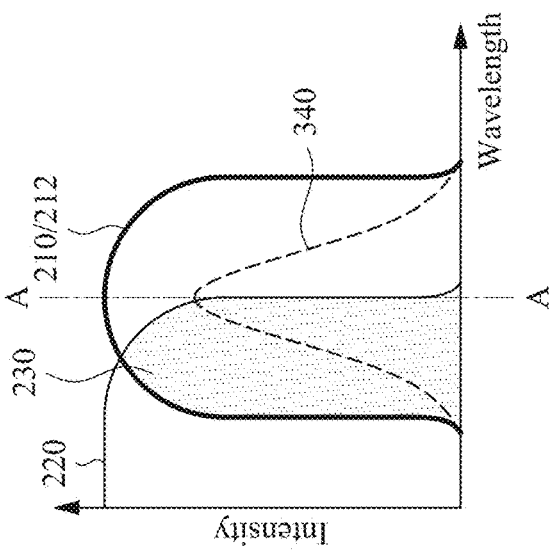

Referring to FIGS. 6A-6C, the first filter 210 and the third filter 212 are the same long band-pass filter, and the second filter 220 is a short-pass filter with a wavelength range partially overlapped with that of the first filter 210. For the spectrum 340, the first image signal is the full spectrum 340, and the second image signal is the left half part of the spectrum 340. To obtain a positive signal value γ for red shift from the spectrum 340 to the spectrum 342 and a negative signal value γ for blue shift from the spectrum 340 to the spectrum 344, the signal value γ is obtained from an Equation (II):

$$\gamma = \frac{(I_L - RI_B) - RI_B}{I_L} = \frac{I_L - 2RI_B}{I_L}, \quad \text{Equation (II)}$$

where R is an equilibrium parameter; $I_L$ is the image intensity filtered by the first filter 210; and $I_B$ is the image intensity filtered by the double-layered filter 230.

For the spectrum 340, a difference between a peak wavelength of the spectrum 340 and a center wavelength of the first filter 210 and a difference between the peak wavelength of the spectrum 340 and a cut-off wavelength of the second filter 220 may both be within ±5 nm, such that the image intensity filtered by the double-layered filter 230 (i.e., the second image intensity) is half of the image intensity filtered by the first filter 210 (i.e., the first image intensity), and a signal value γ1 being equal to zero is obtained from the Equation (II). When the spectrum 340 is shifted to the spectrum 342, the signal value γ1 changes to a positive signal value γ2 for the red shift of the spectrum. When the spectrum 340 is shifted to the spectrum 344, the signal value γ1 changes to a negative signal value γ2 for the blue shift of the spectrum.

Figure 7C:
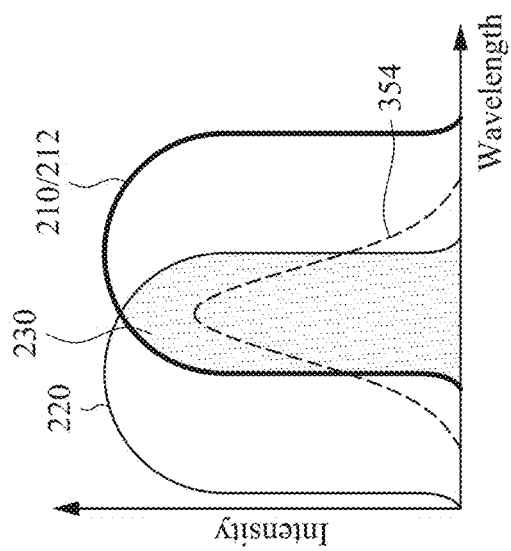
Figure 7B:
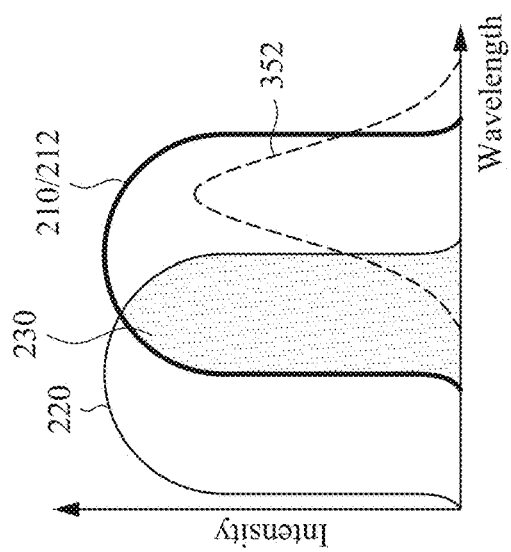
Figure 7A:
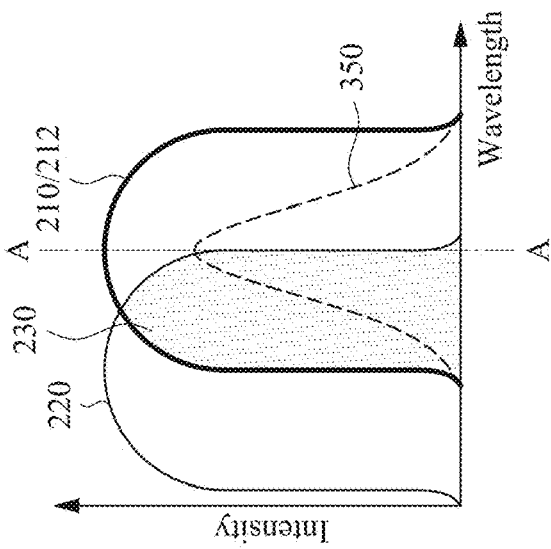

Referring to FIGS. 7A-7C, the first filter 210 and the third filter 212 are the same long band-pass filter, and the second filter 220 is a short band-pass filter with a wavelength range partially overlapped with that of the first filter 210. Since the wavelength range of the first filter 210, the wavelength range of the double-layered filter 230, and the position of the spectrum 350 are similar to those of FIGS. 6A-6C, the signal values γ of the spectra 350 to 354 may be obtained from the Equation (II), where R is an equilibrium parameter; $I_L$ is the image intensity filtered by the first filter 210; and $I_B$ is the image intensity filtered by the double-layered filter 230.

In the embodiments illustrated in FIG. 1 and FIGS. 2A-2B, the filter array 200 filters the light beam 10b into the light beam 10c and the light beam 10c', so that the biosensor 10 simultaneously provides the two image signals filtered by the first filter 210 and filtered by the double-layered filter 230. In some other embodiments, the filter array may filter the light beam from the sample substrate into more than two light beams with different spectra, thereby simultaneously providing more than two image signals to determine the spectrum shift. This adjusted filter array may broaden the detection range of the spectrum shift. In other words, the filter array may include different filter combinations to match with the wavelength and the spectrum shift of the light beam from the biosample. The filter combinations of the filter array may not only miniaturize and simplify the biosensor but also increase the flexibility of the spectrum shift detection range of the biosensor.

Figure 8:
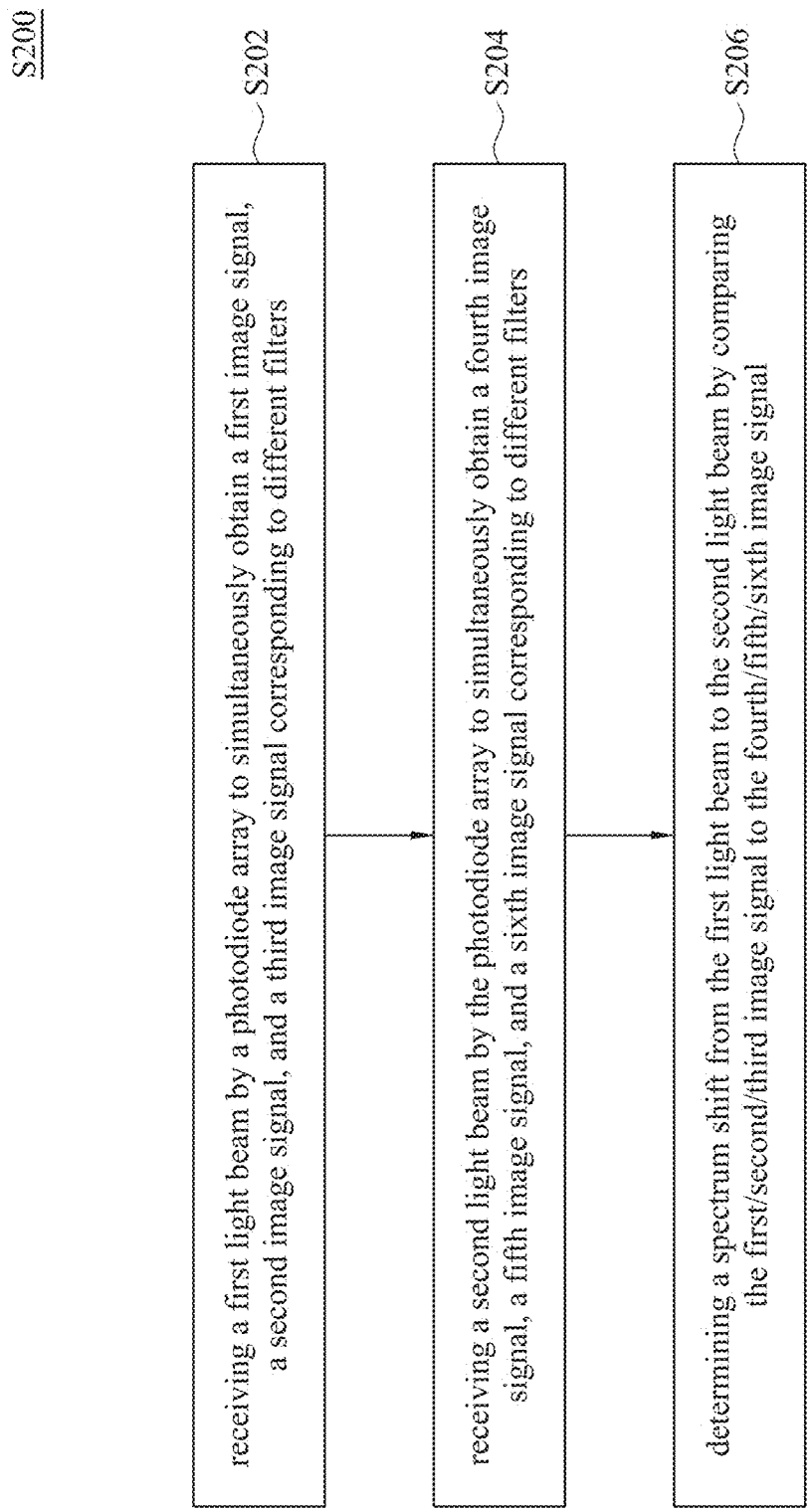
FIG. 8 illustrates a flow diagram of an imaging method for detecting spectrum shift according to some embodiments of the present disclosure.
Figure 9D:
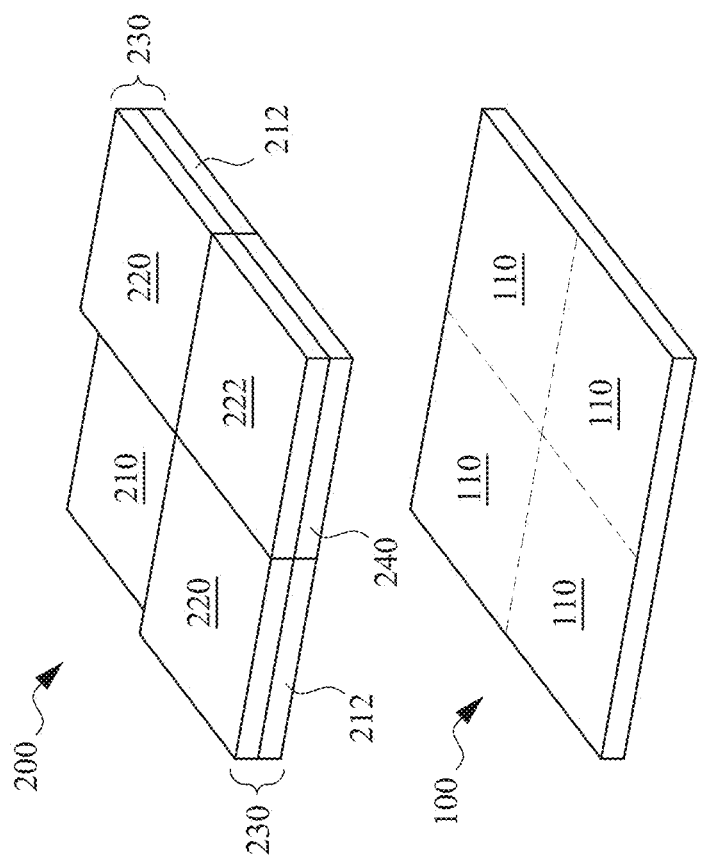

According to some embodiments of the present disclosure, FIG. 8 illustrates a flow diagram of an imaging method S200 for detecting spectrum shift, FIG. 9A illustrates a schematic view of a biosensor 20 for performing the imaging method S200 in FIG. 8, and FIGS. 9B-9D illustrate three-dimensional partial views of the biosensor 20 in FIG. 9A. The biosensor 20 is similar to the biosensor 10 in FIGS. 2A-2B, but the filter array 200 of the biosensor 20 includes at least one single-layered first filter 210 with the first wavelength range, at least one double-layered filter 230 with an overlapped range of the first wavelength range and the second wavelength range, and at least one single-layered fourth filter 222 with the second wavelength range same as that of the second filter 220.

In some embodiments, the first filter 210 and the third filter 212 may be positioned in one lower layer of the filter array 200, while the second filter 220 and the fourth filter 222 may be positioned in one upper layer of the filter array 200 to simplify the process for manufacturing the filter array 200. In such embodiments, the fourth filter 222 may be disposed on an underlayer 240, in which the underlayer 240 is positioned in the same lower layer as the first filter 210. The underlayer 240 may be formed of a material having high transmittance of the light beam 20b, so that the fourth filter 222 on the underlayer 240 can still be considered as a single-layered fourth filter 222.

Figure 9C:
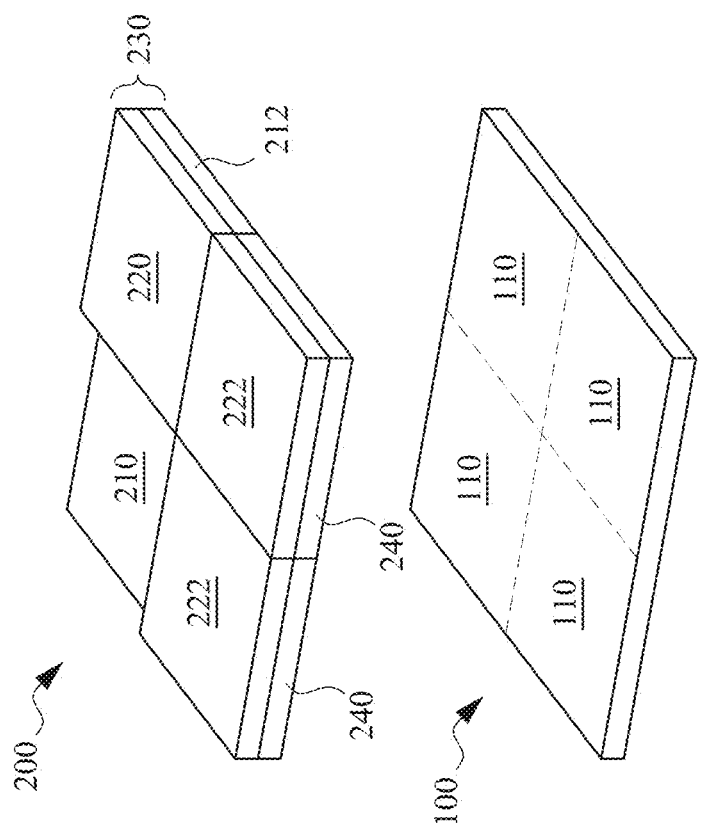

In addition, FIGS. 9B-9D respectively illustrates different ratios and arrangements of the first filter 210, the fourth filter 222, and the double-layered filter 230. As shown in FIGS. 9B-9D, the three kinds of the filters may be alternately arranged, or the same filter may be adjacently arranged. The embodiments illustrated in FIGS. 9B-9D are exemplary cases, and the filter array 200 including different numbers and arrangements of the filters are within the scope of the present disclosure.

After the sample substrate 300 receives the light beam 20a from the light source 400 and emits the light beam 20b toward the filter array 200, the filter array 200 filters the light beam 20b into a light beam 20c within the first wavelength range, a light beam 20c' within an overlapped wavelength range, and a light beam 20c" within the second wavelength range. Each of the photodiodes 110 corresponds to one of the filters in the filter array 200, so that the photodiode array 100 may simultaneously provide intensities of spectra with three different wavelength ranges from multiple photodiodes 110.

The imaging method S200 in FIG. 8 for detecting spectrum shift may be performed by using the biosensor 20 in FIGS. 9A-9B. The imaging method S200 is similar to the imaging method S100 in FIG. 1, but the numbers of the image signals obtained by the imaging method S200 is different due to the adjusted filter array 200. The biosensor 20 in an initial state, such as in the operation S202, simultaneously produces a first image signal corresponding to the initial light beam 20c, a second image signal corresponding to the initial light beam 20c', and a third image signal corresponding to the initial light beam 20c". The biosensor 20 after disposing or reacting the biosample, such as in the operation S204, simultaneously produces a fourth image signal corresponding to the latter light beam 20c, a fifth image signal corresponding to the latter light beam 20c', and a sixth image signal corresponding to the latter light beam 20c". A spectrum shift is then determined in the operation S206 by comparing the first image signal, the second image signal, and the third image signal to the fourth image signal, the fifth image signal, and the sixth image signal.

Figure 10C:
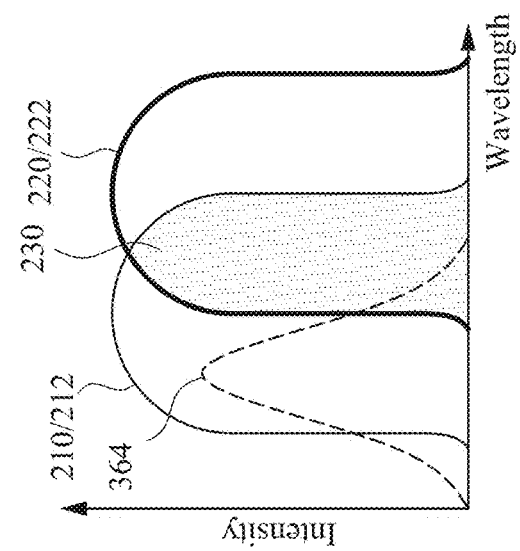
FIGS. 10A-10C and 11A-11C illustrate spectra corresponding to the imaging method in FIG. 8 and the biosensor in FIGS. 9A-9B according to some embodiments of the present disclosure.
Figure 10B:
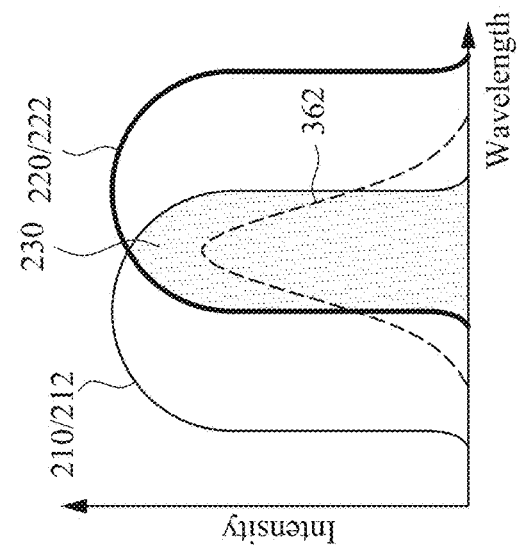
Figure 10A:
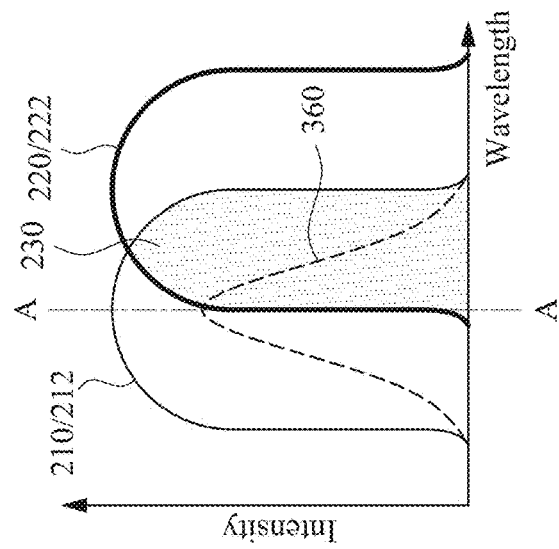

According to one embodiment of the present disclosure, FIGS. 10A-10C respectively illustrates spectra 360-364 corresponding to the imaging method S200 in FIG. 8 and the biosensor 20 in FIGS. 9A-9B. As shown in FIGS. 10A-10C, the first filter 210 and the third filter 212 are the same short band-pass filter, while the second filter 220 and the fourth filter 222 are the same long band-pass filter with a wavelength range partially overlapped with that of the first filter 210. The screentone regions in FIGS. 10A-10C indicate the wavelength range of the double-layered filter 230. The spectra details of FIGS. 10A-10C are similar to those of FIGS. 3A-3C, but the manner to obtain the signal values γ of FIGS. 10A-10C is different from that of FIGS. 3A-3C.

The first image signal to the sixth image signal are used to obtain the signal values γ representing the positions of the spectra 360-364. Specifically, the signal value γ is obtained from an Equation (III):

$$\gamma = \frac{RI_A + (I_L - RI_A) - (I_S - RI_A)}{I_S + I_L - RI_A} = \frac{I_L - I_S + RI_A}{I_L + I_S - RI_A}, \quad \text{Equation (III)}$$

where R is an equilibrium parameter; $I_S$ is the image intensity of the image signal filtered by the first filter 210 (i.e., the first image signal and the fourth image signal); $I_A$ is the image intensity of the image signal filtered by the double-layered filter 230 (i.e., the second image signal and the fifth image signal); and $I_L$ is the image intensity of the image signal filtered by the fourth filter 222 (i.e., the third image signal and the sixth image signal). If $RI_A = I_L - RI_A$, the signal value γ may be alternatively obtained from an Equation (IV):

$$\gamma = \frac{(I_L - RI_A) - RI_A - (I_S - RI_A)}{I_S + I_L - RI_A} = \frac{I_L - I_S - RI_A}{I_L + I_S - RI_A}. \quad \text{Equation (IV)}$$

For the spectrum 360, the signal value γ1 being equal to zero is obtained from the Equation (III). When the spectrum 360 is shifted to the spectrum 362, the signal value γ1 changes to a positive signal value γ2 for the red shift of the spectrum. When the spectrum 360 is shifted to the spectrum 364, the signal value γ1 changes to a negative signal value γ2 for the blue shift of the spectrum.

In some embodiments, the Equation (III) and the Equation (IV) may be simplified to obtain the signal value γ more easily. For example, when $I_L - RI_A = 0$, the Equation (III) may be simplified to an Equation (V):

$$\gamma = \frac{RI_A - (I_S - RI_A)}{I_S + I_L - RI_A} = \frac{2RI_A - I_S}{I_L + I_S - RI_A}. \quad \text{Equation (V)}$$

When $I_S - RI_A = 0$, the Equation (IV) may be simplified to an Equation (VI):

$$\gamma = \frac{(I_L - RI_A) - RI_A}{I_S + I_L - RI_A} = \frac{I_L - 2RI_A}{I_L + I_S - RI_A}. \quad \text{Equation (VI)}$$

Figure 11C:
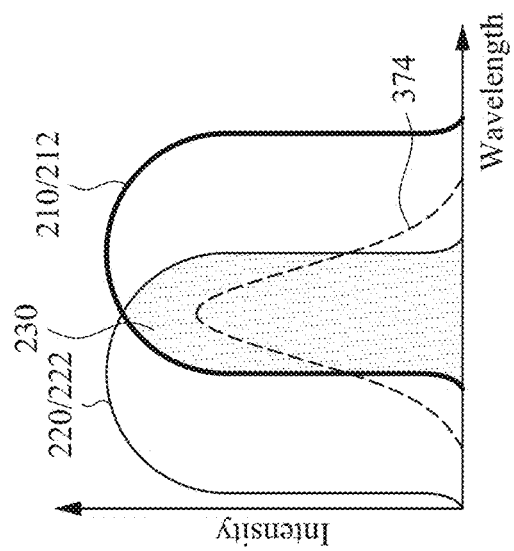
Figure 11B:
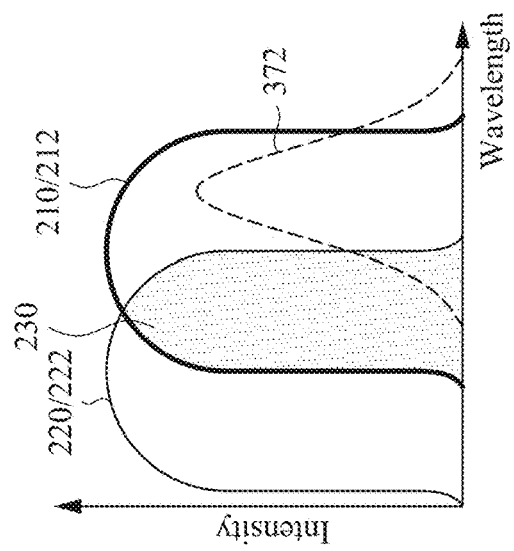
Figure 11A:
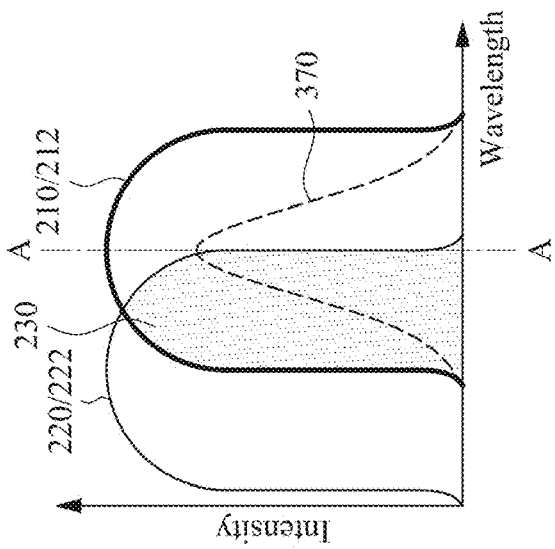

According to one embodiment of the present disclosure, FIGS. 11A-11C respectively illustrates spectra 370-374 corresponding to the imaging method S200 in FIG. 8 and the biosensor 20 in FIGS. 9A-9B. The operations and the biosensor of FIGS. 11A-11C are similar to those of FIGS. 10A-10C, but the first filter 210 and the third filter 212 are the long band-pass filter, and the second filter 220 and the fourth filter 222 are the short band-pass filter with a wavelength range partially overlapped with that of the first filter 210.

To obtain a positive signal value γ for red shift from the spectrum 370 to the spectrum 372 and a negative signal value γ for blue shift from the spectrum 370 to the spectrum 374, the signal value γ is obtained from an Equation (VII):

$$\gamma = \frac{(I_L - RI_B) - RI_B - (I_S - RI_B)}{I_L + I_S - RI_B} = \frac{I_L - I_S - RI_B}{I_L + I_S - RI_B}, \quad \text{Equation (VII)}$$

where R is an equilibrium parameter; $I_L$ is the image intensity of the image signal filtered by the first filter 210; $I_B$ is the image intensity of the image signal filtered by the double-layered filter 230; and $I_S$ is the image intensity of the image signal filtered by the fourth filter 222. If $RI_B=I_S-RI_B$, the signal value γ may be alternatively obtained from an Equation (VIII):

$$\gamma = \frac{(I_L - RI_B) + RI_B - (I_S - RI_B)}{I_L + I_S - RI_B} = \frac{I_L - I_S + RI_B}{I_L + I_S - RI_B}. \quad \text{Equation (VIII)}$$

For the spectrum 370, the signal value γ1 being equal to zero is obtained from the Equation (VII). When the spectrum 370 is shifted to the spectrum 372, the signal value γ1 changes to a positive signal value γ2 for the red shift of the spectrum. When the spectrum 370 is shifted to the spectrum 374, the signal value γ1 changes to a negative signal value γ2 for the blue shift of the spectrum.

In some embodiments, the Equation (VII) and the Equation (VIII) may be simplified to obtain the signal value γ more easily. For example, when $I_S-RI_B=0$, the Equation (VII) may be simplified to an Equation (IX):

$$\gamma = \frac{(I_L - RI_B) - RI_B}{I_L + I_S - RI_B} = \frac{I_L - 2RI_B}{I_L + I_S - RI_B}. \quad \text{Equation (IX)}$$

When $I_L-RI_B=0$, the Equation (VIII) may be simplified to an Equation (X):

$$\gamma = \frac{RI_B - (I_S - RI_B)}{I_L + I_S - RI_B} = \frac{2RI_B - I_S}{I_L + I_S - RI_B}. \quad \text{Equation (X)}$$

Figures 12A, 12B:
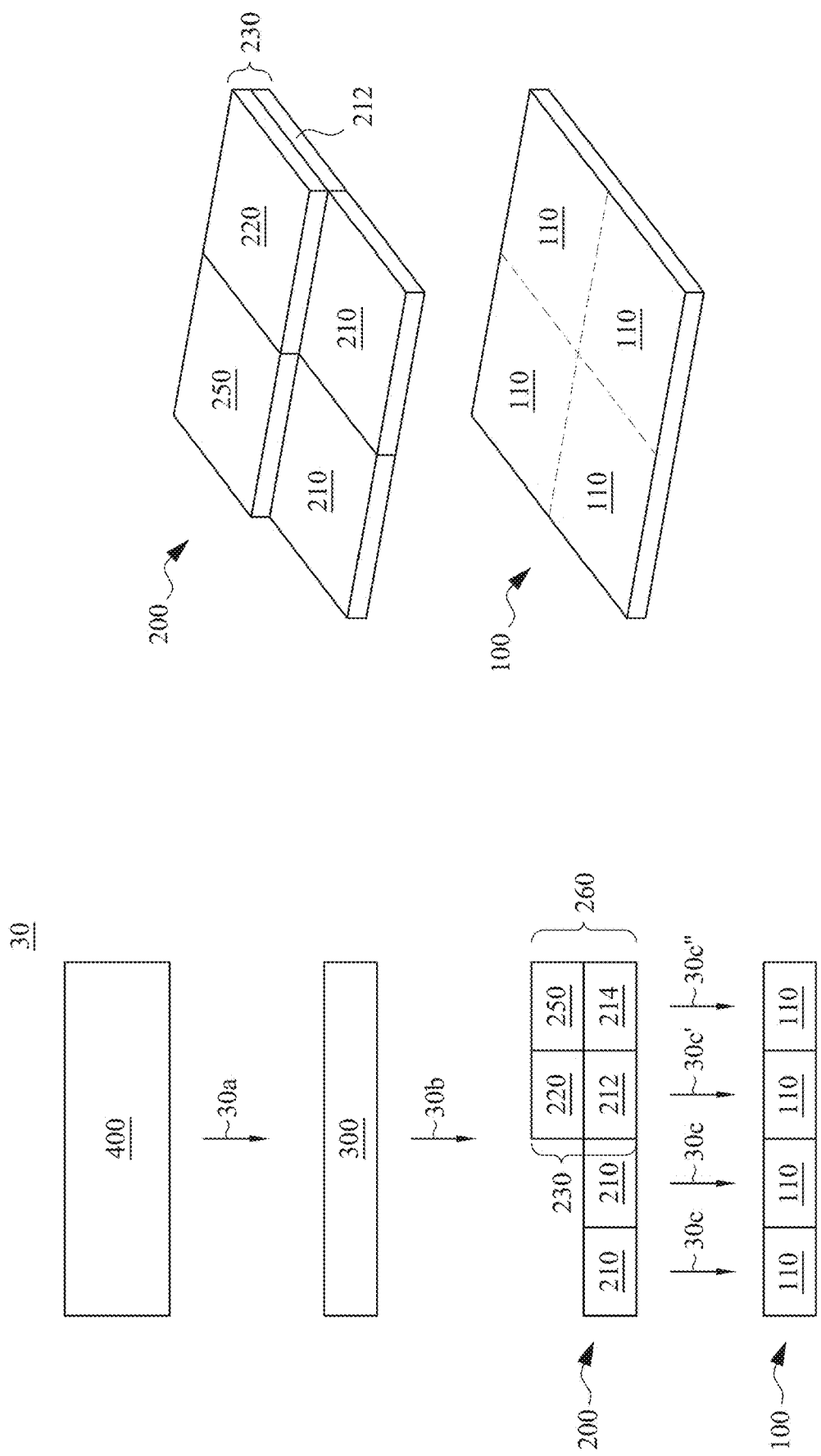
FIG. 12A illustrates a schematic view of a biosensor for performing the imaging method in FIG. 8 according to some embodiments of the present disclosure.
FIG. 12B illustrates a three-dimensional partial view of the biosensor in FIG. 12A according to one embodiment of the present disclosure.

The filter array 200 illustrated in FIGS. 9A-9D includes the first filter 210, the fourth filter 222, and the overlapped third filter 212 and second filter 220 to simultaneously provide three different image signals. In some other embodiments, the filter array 200 may provide three different image signals by a combination of more than two filters. For example, FIG. 12A illustrates a schematic view of a biosensor 30 for performing the imaging method S200 in FIG. 8 according to some embodiments of the present disclosure. FIG. 12B illustrates a three-dimensional partial view of the biosensor 30 in FIG. 12A.

The biosensor 30 is similar to that of FIGS. 9A-9B, but the filter array 200 of the biosensor 30 includes at least one single-layered first filter 210, at least one first double-layered filter 230 including a third filter 212 and a second filter 220 overlapped on the third filter 212, and at least one second double-layered filter 260 including a fifth filter 214 and a fourth filter 250 overlapped on the fifth filter 214. The first filter 210, the third filter 212 and the fifth filter 214 have the same wavelength range. After the sample substrate 300 receives the light beam 30$a$ from the light source 400 and emits the light beam 30$b$ toward the filter array 200, the first filter 210 filters the light beam 30$b$ into a light beam 30$c$ within the first wavelength range, the first double-layered filter 230 filters the light beam 30$b$ into a light beam 30$c$' within an overlapped wavelength range of the first wavelength range and the second wavelength range, and the second double-layered filter 260 filters the light beam 30$b$ into a light beam 30$c$" within an overlapped wavelength range of the first wavelength range and a third wavelength range. The third wavelength range is different from and partially overlapped with the first wavelength range. Each of the photodiodes 110 corresponds to one of the filters in the filter array 200, so that the photodiode array 100 may simultaneously provide intensities of spectra with three different wavelength ranges from multiple photodiodes 110.

Figures 13A, 13B, 13C:
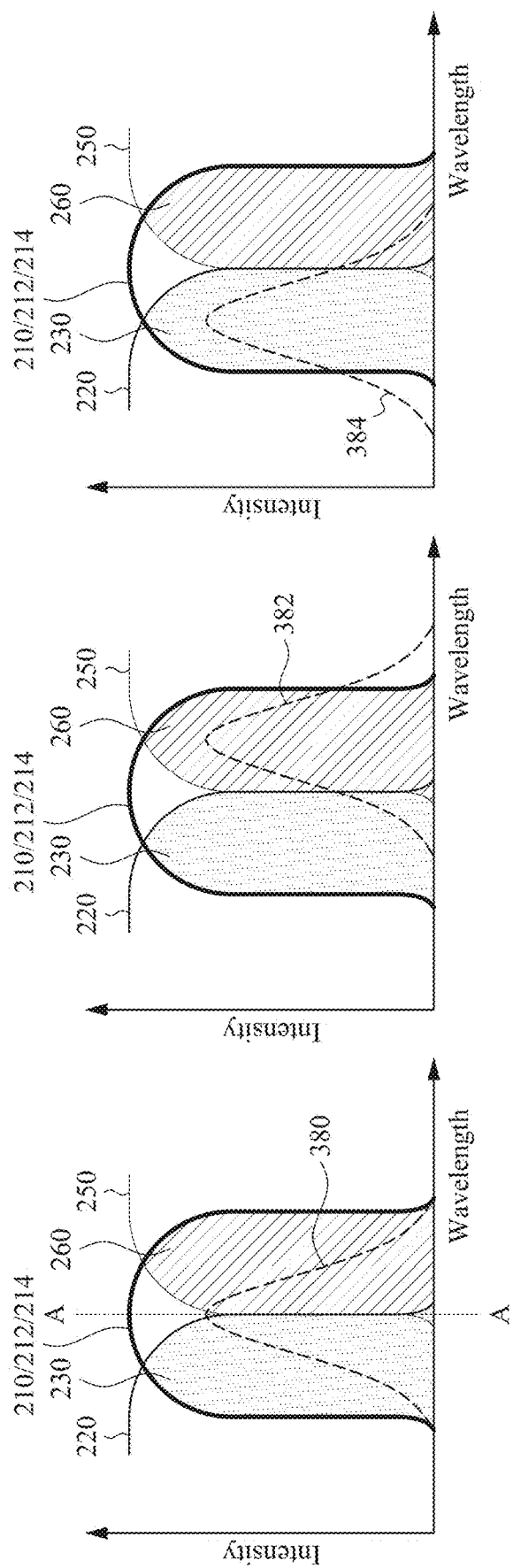

According to one embodiment of the present disclosure, FIGS. 13A-14C respectively illustrates spectra 380-394 corresponding to the imaging method S200 in FIG. 8 and the biosensor 30 in FIGS. 12A-12B. As shown in FIGS. 13A-13C, the filters 210-214 are the same center band-pass filters, the second filter 220 is a short-pass filter with a wavelength range partially overlapped with that of the first filter 210, and the fourth filter 250 is a long-pass filter with a wavelength range partially overlapped with that of the first filter 210. The screentone regions in FIGS. 13A-13C indicate the wavelength range of the first double-layered filter 230 and the second double-layered filter 260.

Referring to FIG. 13A, the biosensor 30 is in an initial state to simultaneously obtain a first image signal corresponding to the initial light beam 30$c$, a second image signal corresponding to the initial light beam 30$c$', and a third image signal corresponding to the initial light beam 30$c$". As shown in FIG. 13A, a difference between the peak wavelength of the spectrum 380 and the center wavelength of the first filter 210, a difference between the peak wavelength of the spectrum 380 and the cut-off wavelength of the second filter 220, and a difference between the peak wavelength of the spectrum 380 and the cut-on wavelength of the fourth filter 250 may be within ±5 nm for the biosensor 30 in the initial state. The slopes of the transition bands of the first filter 210, the second filter 220, and the fourth filter 250 are steeper than the slope of the spectrum 380.

Referring to FIG. 13B and FIG. 13C, a fourth image signal corresponding to the latter light beam 30$c$, a fifth image signal corresponding to the latter light beam 30$c$', and a sixth image signal corresponding to the latter light beam 30$c$" are simultaneously obtained by the biosensor 30 after disposing or reacting the biosample. A spectrum shift is then determined by using the signal value γ obtained from an Equation (XI):

$$\gamma = \frac{R(I_A - I_B)}{I_C}, \quad \text{Equation (XI)}$$

where R is an equilibrium parameter; $I_C$ is the image intensity of the image signal filtered by the first filter 210 (i.e., the first image signal and the fourth image signal); $I_B$ is the image intensity of the image signal filtered by the first double-layered filter 230 (i.e., the second image signal and the fifth image signal); and $I_A$ is the image intensity of the image signal filtered by the second double-layered filter 260 (i.e., the third image signal and the sixth image signal).

For the spectrum 380, the signal value γ1 being equal to zero is obtained from the Equation (XI). When the spectrum 380 is shifted to the spectrum 382, the signal value γ1 changes to a positive signal value γ2 for the red shift of the spectrum. When the spectrum 380 is shifted to the spectrum 384, the signal value γ1 changes to a negative signal value γ2 for the blue shift of the spectrum.

Referring to FIGS. 14A-14C, the filters 210-214 are the same center band-pass filters, the second filter 220 is a short band-pass filter with a wavelength range partially overlapped with that of the first filter 210, and the fourth filter 250 is a long band-pass filter with a wavelength range partially overlapped with that of the first filter 210. Since the wavelength ranges of the first filter 210, the first double-layered filter 230, and the second double-layered filter 260 and the position of the spectrum 390 are similar to those of FIGS. 13A-13C, the signal values γ of the spectra 390 to 394 may be obtained from the Equation (XI).

According to the above-mentioned embodiments, the imaging method for detecting a spectrum shift includes receiving a light beam to simultaneously obtain several image signals with different wavelength ranges and determining the spectrum shift by a signal value obtained from the image intensities of the image signals. Since the image signals are obtained simultaneously, the signal-noise ratio of the signal value may be increased to improve the accuracy of the detection, and the immediate output of the signal value may provide the real time detection of the spectrum shift. In addition, the image signals are filtered by a filter array of single-layered filters and double-layered filters in the biosensor, which miniaturizes the biosensor and increases the flexibility of the spectrum shift detection range.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An imaging method for detecting spectrum shift, comprising:
    receiving a first light beam by a first photodiode and a second photodiode to simultaneously obtain a first image signal with a first image intensity from the first photodiode and a second image signal with a second image intensity from the second photodiode,
    wherein the first image signal corresponds to the first light beam filtered by a first filter, the second image signal corresponds to the first light beam filtered by a first double-layered filter comprising a second filter overlapped on a third filter, and the third filter has a wavelength range same as a wavelength range of the first filter,
    wherein a difference between a peak wavelength of the first image signal and a center wavelength of the first filter is within ±5 nm,
    wherein a difference between the peak wavelength of the first image signal and a cut-on/cut-off wavelength of the second filter is within ±5 nm;
    receiving a second light beam by the first photodiode and the second photodiode to simultaneously obtain a third image signal with a third image intensity from the first photodiode and a fourth image signal with a fourth image intensity from the second photodiode,
    wherein the third image signal corresponds to the second light beam filtered by the first filter, the fourth image signal corresponds to the second light beam filtered by the first double-layered filter; and
    determining a spectrum shift from the first light beam to the second light beam by comparing the first image intensity and the second image intensity to the third image intensity and the fourth image intensity.

2. The imaging method of claim 1, wherein the second image intensity is half of the first image intensity when receiving the first light beam by the first photodiode and the second photodiode.

3. The imaging method of claim 1, wherein a slope of a transition band of the first filter and a slope of a transition band of the second filter are steeper than a slope of the first image signal.

4. The imaging method of claim 1, wherein a wavelength range of the first image signal fully falls in the wavelength range of the first filter when receiving the first light beam by the first photodiode and the second photodiode.

5. The imaging method of claim 1, wherein the first filter is a short band-pass filter, and the second filter is a long-pass filter or a long band-pass filter.

6. The imaging method of claim 5, wherein the short band-pass filter has a bandwidth in a range of 20 nm to 60 nm.

7. The imaging method of claim 5, wherein determining the spectrum shift from the first light beam to the second light beam comprises:
    obtaining a signal value γ1 and a signal value γ2 from an Equation (I):

$$\gamma = \frac{RI_A - (I_S - RI_A)}{I_S} = \frac{2RI_A - I_S}{I_S}, \quad \text{Equation (I)}$$

wherein R is an equilibrium parameter, $I_S$ and $I_A$ are the first image intensity and the second image intensity for the signal value γ1, $I_S$ and $I_A$ are the third image intensity and the fourth image intensity for the signal value γ2; and
    determining the spectrum shift by a difference between the signal value γ1 and the signal value γ2.

8. The imaging method of claim 7, wherein the signal value γ1 equals zero when receiving the first light beam by the first photodiode and the second photodiode.

9. The imaging method of claim 1, wherein the first filter is a long band-pass filter, and the second filter is a short-pass filter or a short band-pass filter.

10. The imaging method of claim 9, wherein determining the spectrum shift from the first light beam to the second light beam comprises:
    obtaining a signal value γ1 and a signal value γ2 from an Equation (II):

$$\gamma = \frac{(I_L - RI_B) - RI_B}{I_L} = \frac{I_L - 2RI_B}{I_L}, \quad \text{Equation (II)}$$

wherein R is an equilibrium parameter, $I_L$ and $I_B$ are the first image intensity and the second image intensity for the signal value γ1, $I_L$ and $I_B$ are the third image intensity and the fourth image intensity for the signal value γ2; and
    determining the spectrum shift by a difference between the signal value γ1 and the signal value γ2.

11. The imaging method of claim 1, wherein receiving the first light beam by the first photodiode and the second photodiode further comprises receiving the first light beam by a third photodiode to simultaneously obtain a fifth image signal with a fifth image intensity from the third photodiode, the fifth image signal corresponds to the first light beam filtered by a fourth filter, and the fourth filter has a wavelength range same as a wavelength range of the second filter; and wherein receiving the second light beam by the first photodiode and the second photodiode further comprises receiving the second light beam by the third photodiode to simultaneously obtain a sixth image signal with a sixth image intensity from the third photodiode, the sixth image signal corresponds to the second light beam filtered by the fourth filter.

12. The imaging method of claim 11, wherein the first filter is a short band-pass filter, and the second filter is a long band-pass filter; and wherein determining the spectrum shift from the first light beam to the second light beam comprises:
obtaining a signal value γ1 and a signal value γ2 from an Equation (III) or an Equation (IV):

$$\gamma = \frac{RI_A + (I_L - RI_A) - (I_S - RI_A)}{I_S + I_L - RI_A} = \frac{I_L - I_S + RI_A}{I_L + I_S - RI_A} \qquad \text{Equation (III)}$$

$$\gamma = \frac{(I_L - RI_A) - RI_A - (I_S - RI_A)}{I_S + I_L - RI_A} = \frac{I_L - I_S - RI_A}{I_L + I_S - RI_A}, \qquad \text{Equation (IV)}$$

wherein R is an equilibrium parameter, $(I_S, I_A, I_L)$ are the first image intensity, the second image intensity, and the fifth image intensity for the signal value γ1, $(I_S, I_A, I_L)$ are the third image intensity, the fourth image intensity, and the sixth image intensity for the signal value γ2; and
determining the spectrum shift by a difference between the signal value γ1 and the signal value γ2.

13. The imaging method of claim 12, wherein the Equation (III) is simplified to an Equation (V) when $I_L - RI_A = 0$:

$$\gamma = \frac{RI_A - (I_S - RI_A)}{I_S + I_L - RI_A} = \frac{2RI_A - I_S}{I_L + I_S - RI_A}, \qquad \text{Equation (V)}$$

and wherein the Equation (IV) is simplified to an Equation (VI) when $I_S - RI_A = 0$:

$$\gamma = \frac{(I_L - RI_A) - RI_A}{I_S + I_L - RI_A} = \frac{I_L - 2RI_A}{I_L + I_S - RI_A}. \qquad \text{Equation (VI)}$$

14. The imaging method of claim 11, wherein the first filter is a long band-pass filter, and the second filter is a short band-pass filter; and wherein determining the spectrum shift from the first light beam to the second light beam comprises:
obtaining a signal value γ1 and a signal value γ2 from an Equation (VII) or an Equation (VIII):

$$\gamma = \frac{(I_L - RI_B) - RI_B - (I_S - RI_B)}{I_L + I_S - RI_B} = \frac{I_L - I_S - RI_B}{I_L + I_S - RI_B} \qquad \text{Equation (VII)}$$

$$\gamma = \frac{(I_L - RI_B) + RI_B - (I_S - RI_B)}{I_L + I_S - RI_B} = \frac{I_L - I_S + RI_B}{I_L + I_S - RI_B}, \qquad \text{Equation (VIII)}$$

wherein R is an equilibrium parameter, $(I_L, I_B, I_S)$ are the first image intensity, the second image intensity, and the fifth image intensity for the signal value γ1, $(I_L, I_B, I_S)$ are the third image intensity, the fourth image intensity, and the sixth image intensity for the signal value γ2; and
determining the spectrum shift by a difference between the signal value γ1 and the signal value γ2.

15. The imaging method of claim 14, wherein the Equation (VII) is simplified to an Equation (IX) when $I_S - RI_B = 0$:

$$\gamma = \frac{(I_L - RI_B) - RI_B}{I_L + I_S - RI_B} = \frac{I_L - 2RI_B}{I_L + I_S - RI_B}, \qquad \text{Equation (IX)}$$

and wherein the Equation (VIII) is simplified to an Equation (X) when $I_L - RI_B = 0$:

$$\gamma = \frac{RI_B - (I_S - RI_B)}{I_L + I_S - RI_B} = \frac{2RI_B - I_S}{I_L + I_S - RI_B}. \qquad \text{Equation (X)}$$

16. The imaging method of claim 1, wherein receiving the first light beam by the first photodiode and the second photodiode further comprises receiving the first light beam by a third photodiode to simultaneously obtain a fifth image signal with a fifth image intensity from the third photodiode, the fifth image signal corresponds to the first light beam filtered by a second double-layered filter comprising a fourth filter overlapped on a fifth filter, and the fifth filter has a wavelength range same as the wavelength range of the first filter; and wherein receiving the second light beam by the first photodiode and the second photodiode further comprises receiving the second light beam by the third photodiode to simultaneously obtain a sixth image signal with a sixth image intensity from the third photodiode, the sixth image signal corresponds to the second light beam filtered by the second double-layered filter.

17. The imaging method of claim 16, wherein the first filter is a center band-pass filter, the second filter is a short-pass filter or a short band-pass filter, and the fourth filter is a long-pass filter or a long band-pass filter.

18. The imaging method of claim 16, wherein determining the spectrum shift from the first light beam to the second light beam comprises:
obtaining a signal value γ1 and a signal value γ2 from an Equation (XI):

$$\gamma = \frac{R(I_A - I_B)}{I_C}, \qquad \text{Equation (XI)}$$

wherein R is an equilibrium parameter, $(I_C, I_B, I_A)$ are the first image intensity, the second image intensity, and the fifth image intensity for the signal value γ1, $(I_C, I_B, I_A)$ are the third image intensity, the fourth image intensity, and the sixth image intensity for the signal value γ2; and
determining the spectrum shift by a difference between the signal value γ1 and the signal value γ2.

19. A biosensor for performing the imaging method of claim 1, comprising:
a photodiode array comprising the first photodiode and the second photodiode;
a filter array comprising the first filter and the first double-layered filter above the photodiode array, wherein the first photodiode and the second photodiode corresponds to the first filter and the first double-layered filter respectively;
a sample substrate above the filter array; and
a light source above the sample substrate.

20. The biosensor of claim 19, wherein the light source is configured to generate a surface plasmon resonance spectrum, and wherein a wavelength range of the light source covers wavelength ranges of the filter array.

* * * * *